(12) United States Patent
Walker et al.

(10) Patent No.: US 6,267,292 B1
(45) Date of Patent: *Jul. 31, 2001

(54) METHOD AND APPARATUS FOR FUNDS AND CREDIT LINE TRANSFERS

(75) Inventors: Jay S. Walker, Ridgefield; Sanjay K. Jindal, Wilton; James A. Jorasch, Stamford, all of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/359,002

(22) Filed: Jul. 22, 1999

Related U.S. Application Data

(63) Continuation of application No. 08/874,280, filed on Jun. 13, 1997, now Pat. No. 5,949,044.

(51) Int. Cl.[7] .................................................. G06F 17/60
(52) U.S. Cl. ............................ 235/379; 235/380; 380/23; 705/35
(58) Field of Search .................................... 235/379, 380, 235/382, 375; 380/23, 24, 25; 705/35, 39

(56) References Cited

U.S. PATENT DOCUMENTS

| | | |
|---|---|---|
| 3,376,661 | 4/1968 | Hulet . |
| 3,852,571 | * 12/1974 | Hall et al. ............................ 235/379 |
| 4,023,012 | 5/1977 | Ano et al. . |
| 4,048,475 | 9/1977 | Yoshida . |
| 4,359,628 | 11/1982 | Lambert . |

(List continued on next page.)

FOREIGN PATENT DOCUMENTS

WO 96/34356   10/1996   (WO) .

OTHER PUBLICATIONS

Robert Teitelman, "How the Cash Flows", Institutional Investor, p. 58, Aug. 1996.

Lisa Fickenscher, "Merchant: American Express Seeks to Mine Its Data on Cardholder Spending Patterns", The American Banker, p. 20, Mar. 24, 1997.

"The PErFeCT Inhustry", (http://www.hpos.com), download date Mar. 10, 1998.

"Young Adult Credit Card", Elan Financial Services of Illinois, Aug. 1996.

Jane Bryant Quinn, "Staying Ahead—Students Learn That Getting A Credt Card Can Be As Easy As ABC", The Washington Post, Jan. 30, 1989.

"Spain BBV launches new card", Cards International, Jun. 22, 1995 at p. 5.

Lisa Fickenscher, "Secured credit cards losing fly–by–night image", American Banker, vol. 158; No. 164; p. 16(2); Aug. 26, 1993.

David Chaum, "Prepaid Smart Card Techniques: A Brief Introduction and Comparison", (http://www.digicash.com/news/archive/cardcom.html), Copyright 1994 by DigiCash bv.

(List continued on next page.)

Primary Examiner—Karl D. Frech
Assistant Examiner—Daniel St. Cyr
(74) Attorney, Agent, or Firm—Dean P. Alderucci

(57) ABSTRACT

A financial tender transfer system allows a transferor to transfer credit or make payment to a transferee by debiting the credit card of the transferor and crediting the credit card of the transferee. The financial tender transfer system gives the transferee immediate access to the transferred money and ensures the transferor's credit card is valid. Neither party needs to give their credit card number to the other, so security is preserved. Any amount of value up to the full credit line of the transferor can be transferred to the transferee.

16 Claims, 28 Drawing Sheets

U.S. PATENT DOCUMENTS

| | | |
|---|---|---|
| 4,395,628 | 7/1983 | Silverman et al. . |
| 4,523,087 | 6/1985 | Benton . |
| 4,594,663 * | 6/1986 | Nagata et al. ................. 235/380 |
| 4,599,509 | 7/1986 | Silverman et al. . |
| 4,667,087 | 5/1987 | Quintana . |
| 4,837,422 | 6/1989 | Dethloff et al. . |
| 4,968,873 | 11/1990 | Dethloff et al. . |
| 5,053,607 | 10/1991 | Carlson et al. . |
| 5,175,416 * | 12/1992 | Mansvelt et al. ................. 235/379 |
| 5,193,114 | 3/1993 | Moseley . |
| 5,221,838 | 6/1993 | Gutman et al. . |
| 5,311,594 | 5/1994 | Penzias . |
| 5,361,062 | 11/1994 | Weiss et al. . |
| 5,457,747 | 10/1995 | Drexler et al. . |
| 5,461,217 * | 10/1995 | Claus ................................. 235/380 |
| 5,485,510 | 1/1996 | Colbert . |
| 5,485,519 | 1/1996 | Weiss . |
| 5,526,428 | 6/1996 | Arnold . |
| 5,559,313 | 9/1996 | Claus et al. . |
| 5,562,428 | 10/1996 | Bailey et al. . |
| 5,585,787 | 12/1996 | Wallerstein . |
| 5,590,038 | 12/1996 | Pitroda . |
| 5,650,604 * | 7/1997 | Marcous et al. ................. 235/379 |
| 5,659,165 * | 8/1997 | Jennings et al. ................. 235/379 |
| 5,677,955 * | 10/1997 | Doggett et al. ................. 380/14 |
| 5,689,652 | 11/1997 | Lupien et al. . |
| 5,691,525 | 11/1997 | Aoki et al. . |
| 5,754,653 | 5/1998 | Canfield . |
| 5,949,044 * | 9/1999 | Walker et al. ................. 235/379 |
| 6,044,360 | 3/2000 | Picciallo . |

OTHER PUBLICATIONS

Mary Ann McNulty, "First Bank is First Out With Relocation Card; Lauches corporate cards for employee relocation expenses", Business Travel News Apr. 17, 1995, p. 16.

Margaret Mannix, "I like plastic—so make me an offer", U.S. News & World Report, New You Can Use Section, vol. 118; No. 21; p. 64, May 29, 1995.

* cited by examiner

CUSTOMER DATABASE 250

| NAME | CUSTOMER ID NUMBER | CREDIT CARD TYPE | FULL CREDIT CARD NUMBER | PARTIAL CREDIT CARD NUMBER | EXPIRATION DATE | BANK ID NUMBER |
|---|---|---|---|---|---|---|
| JOHN DOE | AH505 | VISA | 3230-2222-3457-3769 | 573769 | 08/99 | 3230 |
| DAVID BLAND | DN344 | MASTERCARD | 6574-1298-3408-3324 | 083324 | 09/98 | 6574 |

FIG. 4

TRANSACTION DATABASE 255

| TRANSACTION ID NUMBER | TRANSACTION RECEIVED TIME/DATE | TRANSACTION AMOUNT | TRANSFEROR CUSTOMER ID NUMBER | TRANSFEREE CUSTOMER ID NUMBER | TRANSFEROR BANK COMPLETION CODE | TRANSFEREE BANK COMPLETION CODE | TRANSACTION COMPLETED TIME/DATE |
|---|---|---|---|---|---|---|---|
| 262789 | 9:30 PM 11/12/97 | $100.00 | AH505 | DN344 | 2367TR | 9813FC | 10:15 PM 11/12/97 |
| 262790 | 9:35 PM 11/12/97 | $65.00 | AH505 | YW199 | 4571LK | 3447QV | 2:00 AM 11/13/97 |

FIG. 5

CARDHOLDER ACCOUNT DATABASE 355

| CUSTOMER ACCOUNT NUMBER | NAME | ADDRESS | TELEPHONE NUMBER | ORIGINAL CREDIT LINE | AVAILABLE CREDIT LINE |
|---|---|---|---|---|---|
| 9876-6542-1265-8745 | JOE SMITH | 4 MAIN ST, PLACE, CT | (203) 555-1212 | $5000 | $2500 |
| 4568-8888-5555-6666 | JILL JONES | 4 NORTH AVE, TOWN, CT | (203) 987-6543 | $4000 | $1500 |

FIG. 6

FINANCIAL TENDER TRANSFER DATABASE 350

| TRANSACTION ID NUMBER | TIME/DATE | TRANSACTION AMOUNT | TRANSACTION TYPE | CREDIT CARD NUMBER |
|---|---|---|---|---|
| 987654 | 10:00 AM | INCREASE $2500.00 | FUNDS TRANSFER | 9874-7896-6541-4563 |
| 456789 | 12:00 PM | DECREASE $750.00 | FUNDS TRANSFER | 1236-6545-7777-9517 |

FIG. 7

| CUSTOMER ACCOUNT NUMBER | NAME | ADDRESS | TELEPHONE NUMBER | ORIGINAL CREDIT LINE | AVAILABLE CREDIT LINE |
|---|---|---|---|---|---|
| 9876-6542-1265-8745 | JOE SMITH | 4 MAIN ST, PLACE, CT | (203) 555-1212 | $5000 | $2500 |
| 4568-8888-5555-6666 | JILL JONES | 4 NORTH AVE, TOWN, CT | (203) 987-6543 | $4000 | $1500 |

CUSTOMER ACCOUNT DATABASE 1640

FINANCIAL TENDER / CREDIT LINE
TRANSFER DATABASE 1650

| CREDIT CARD NUMBER | CREDIT LINE TRANSFER AMOUNT | AUTHORIZATION CODE | COMPLETION CODE | CORRESPONDING ACCOUNT NUMBER | TRANSACTION TYPE |
|---|---|---|---|---|---|
| 9876-6542-1265-8745 | $1,000 | 2244 | 8525 | 9999-8888-7777-6666 | CREDIT LINE TRANSFER |
| 4568-8888-5555-6666 | $2,000 | 2345 | 3698 | 22-1234 | CREDIT LINE TRANSFER |

FIG. 19

METHOD AND APPARATUS FOR FUNDS AND CREDIT LINE TRANSFERS

This application is a continuation of U.S. patent application Ser. No. 09/359,002 filed Jul. 22, 1999, which is a continuation of U.S. patent application Ser. No. 08/874,280 filed Jun. 13, 1997 (and now issued as U.S. Pat. No. 5,949,044). Each of the above is incorporated herein by reference.

BACKGROUND OF THE INVENTION

A. Field of the Invention

The present invention relates generally to the field of funds and/or credit line transfers and, more particularly, to funds and/or credit line transfers between credit card accounts.

B. Description of the Related Art

People exchange money using a variety of methods. For example, in lieu of paying cash for goods and services, people often choose to pay for such purchases using credit cards or checks. In a typical credit card transaction, a merchant calculates the amount of a purchase and asks the buyer for payment. The buyer then presents the merchant with a credit card. The merchant runs the credit card through a point of sale unit with the amount of the sale entered either manually or automatically by a cash register. Once entered, the merchant's acquiring bank, or credit card processor, receives the credit card data and sales amount with a request for authorization of the sale. The credit card data includes the credit card number, which identifies the type of card, the issuing bank, and the cardholder's account.

After processing the transaction, the acquiring bank routes an authorization request to the buyer's credit card issuing bank. If the cardholder has enough credit to cover the sale, the issuing bank authorizes the transaction and generates an authorization code. The issuing bank sends this code to the acquiring bank and puts a hold on the cardholder's account for the amount of the sale. Based on the code received from the issuing bank, the acquiring bank sends an approval or denial code to the merchant's point of sale unit, which has a separate terminal identification number to enable credit card processors to route data back to the particular unit. The point of sale unit or cash register then prints out a sales draft or slip to be signed by the buyer, which obligates the buyer to reimburse the card-issuing bank for the amount of the sale.

At a later time, generally the end of the day, the merchant reviews all authorizations stored in the point of sale unit against the signed sales drafts. When all the credit card authorizations have been verified to match all the actual sales drafts, the merchant captures, or transmits, the data on each authorized credit card transaction to the acquiring bank for deposit. This action is in lieu of depositing the actual signed paper drafts with the bank.

The acquiring bank performs an interchange for each sales draft with the appropriate card-issuing bank. The card-issuing bank transfers the amount of the sales draft to the acquiring bank, minus an interchange fee, which is typically between 2–4% of the transaction value. The acquiring bank then deposits the amount of all the sales drafts submitted by the merchant, less a discount fee, into the merchant's bank account.

To confirm validity of a credit card, the issuing bank reviews the credit card account number using a checksum algorithm that prevents others from creating valid account numbers. For example, a standard Visa or MasterCard account number is 16 digits and the algorithm reduces the probability of someone fraudulently creating a valid number to approximately 1 in 500,000.

Due to the perceived risk of fraud and the potential for monetary loss, most consumers prefer not to provide credit card account numbers to another person, particularly when the consumer has no way of knowing the identity or trustworthiness of the recipient of this information. Many consumers thus hesitate to use a credit card for telephone orders, such as catalog orders, for fear that some catalog company operators may misuse their card number.

Credit card institutions also offer so-called "convenience checks." Convenience checks can be used to purchase goods and services in the same manner as a conventional check, except that the convenience check clears against the cardholder's available credit line. The convenience check amount is generally recorded as a cash advance on the cardholder's monthly billing statement.

Credit cards today have become a pervasive method of payment for goods and services. They not only offer convenience, security, and flexibility in the commercial transaction process, but also provide some limited flexibility in the assignment of debt obligation. For example, it is well known in the art that credit card holders are free to transfer debt between accounts, thereby taking advantage of different account features, such as lower interest rates. Such transfers are typically done by paying off the old account with a convenience check or electronic funds transfer, which draws the old account balance onto the new credit card account.

Credit card companies also offer limited-use credit cards that permit employees to charge debt against a company account. For example, when relocating employees, some companies pay relocation expenses by issuing a credit card on the company's account with a predetermined credit limit for the card. The employee may use the card for purchases and cash advances up to the limit. The corporation maintains liability for the account debt, thus essentially taking the responsibility of paying the relocation expenses.

Credit card companies also offer co-signed accounts and accounts with multiple, or supplemental, cards. With co-signed accounts, a co-signer assumes direct liability for any credit card debt reneged on by the principal cardholder. Supplemental card systems permit a principal account owner to provide cards issued on the same account to other family members. The principal account owner maintains liability for all debt accrued by the other users. Similar to supplemental cards, corporate cards provide employees with access to a corporate credit line and the corporation maintains liability for all debt accrued by the employees.

For the limited-use, co-signed, supplemental, and corporate credit card accounts, unused available credit line represents a level of risk exposure by the party liable for the debt. For example, available credit could be misused by the employee or by a thief if the card is lost or stolen. In fact, many corporate cards have higher risk exposure than consumer cards, in part because many state and federal laws limiting liability apply to consumer-issued cards, but not to corporate-issued cards.

Besides credit cards, another widely-used payment method involves the use of personal checks. Consumers use personal checks to settle debts, pay bills, or make a variety of purchases. In general, banks issue personal checks to consumers following the establishment of an account with the bank. The bank, however, typically requires that consumers have sufficient funds in their accounts to cover all payments made using personal checks.

Banks also provide consumers with the option of using "certified checks" or "bank checks" as a payment method. With a certified check, a bank prints special indicia on a personal check that verifies that the bank has segregated sufficient funds in the consumer's account to cover the value of the check. The bank will not release those funds to anyone other than the check's presenter except under narrow and defined circumstances, e.g., proof that the check was destroyed or lost. Certified checks provide the transferee with a high degree of confidence that the check can be cashed for the value stated on its face.

Bank checks are drawn on the bank's own account instead of a consumer's account. It is made out to a transferee specified by the party who paid the bank in advance for the value of the check. Unlike certified checks that are returned to the transferor after being cashed, bank checks are returned to the bank because they are drawn on the bank's own account. Bank checks can be used, for example, when the issuing party does not want to reveal his identity, or when the receiving party wants to minimize the chance of revocability.

Another method of transferring money involves the use of money orders. A money order is very similar to a bank check except that it is issued by a non-bank party such as a post office. Alternatively, people transfer funds by "wiring" money. To wire money, a consumer pays a fee and prepays a third-party to instruct a distant party to disburse an amount of money (usually cash) to a specified person. Electronic funds transfer (EFT) offers yet another method for parties to transfer money. EFT involves securely moving money from one account directly to another electronically.

These methods for exchanging or transferring money suffer from a number of shortcomings. For instance, not one of these conventional methods permits a direct exchange of credit where the credit card of the transferor is debited while the credit card of the transferee is credited in settlement of the transferor's debt to the transferee.

Even if the transferor uses a convenience check in settlement of the debt, the non-merchant transferee has no way to know whether the transferor has sufficient credit available to cover the value of the check. Also, even if the transferee could know that sufficient credit was available at the time the check was presented, the available credit could be fully or partially used by the transferor before the check is processed.

Another shortcoming of conventional payment schemes is that, except for cash, there is no way for one person to pay another person so that the transferee is able to use the value transferred without first processing the transfer instrument by, for example, depositing the instrument with a bank or converting it into cash. In other words, the recipient of a check must convert the check into cash or deposit the check in a bank account before withdrawing cash or writing checks against the transferred value.

There are some narrowly usable instruments such as gift certificates or casino chips which are bearer instruments of value, and thus do not require conversion prior to use. These instruments, however, are denominated in specified amounts and are not widely usable like cash or a credit card. This same limitation holds true for bank checks, certified checks and money orders. Only wiring money to another party allows the recipient to receive cash immediately, though he must first travel to a location where an agent of the wiring process is available to disburse funds.

Another shortcoming, particularly with respect to credit cards, is that a cardholder's unused credit line has no resalable value. In a strict financial sense, unused credit capacity is an economic asset (borrowing capability) that has value, particularly if the unused money is below current market rates. For example, if a consumer has a $5,000 credit line on his credit card at an introductory rate of 6%, the consumer might desire to use $1,000 of the line himself and use the other $4,000 of the line to relend to another borrower at an interest rate higher than 6%, keeping the interest rate differential as a profit. However, currently there is no way for a cardholder to use his unused credit line as a revenue generating asset because the credit line is irrevocably assigned to a given card and cannot be transferred in any way.

In addition, with respect to limited-use, co-signed, supplemental, and corporate credit card accounts, there is no way for the party liable for the debt, such as a company, to enable a cardholder, such as an employee, to increase or decrease credit available on a given credit card as needed and authorized by the company. Also, there is no way for an individual to assign part of his available credit line to another card for specific reasons.

SUMMARY OF THE INVENTION

Systems consistent with the present invention allow a transferor to transfer credit or make payment to a transferee by debiting the credit card of the transferor and crediting the credit card of the transferee. Payment of a financial tender value, such as funds and partial credit lines, in an amount of value up to the available credit line of the transferor can be transferred to the transferee. The transfer of the financial tender value permits the transferee to access the transferred money or credit line immediately after the completion of the transfer. Neither party needs to give their complete credit card number to the other, so security is preserved. Prior to a transfer of a financial tender value, the validity of the transferor's credit card and the availability of sufficient credit is confirmed. The system thus provides a great deal of convenience to both parties and enables a transferor and transferee to make a transfer of financial tender in lieu of checks.

Systems consistent with the present invention benefit card issuers by facilitating increased card usage through providing further opportunities for parties to use their credit cards. In addition, credit card issuers will benefit from increased charge volume at a reduced risk, and potentially from fees for providing the transfer service as well.

The following description, as well as the practice of the invention, set forth and suggest additional advantages and purposes of this invention. The elements and combinations set forth in the claims achieve these advantages and purposes.

To obtain the advantages and in accordance with the purpose of the invention, as embodied and broadly described herein, a method for transferring credit between multiple credit card accounts comprises the steps of: identifying a transferor credit card account; identifying a transferee credit card account; identifying a financial tender value to be transferred from said transferor credit card account to said transferee credit card account; and initiating the transfer of said financial tender value from said transferor credit card account to said transferee credit card account.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

FIG. 4 is a table representing a customer database;

FIG. 5 is a table representing a transaction database;

FIG. 6 is a table representing a customer account database;

FIG. 7 is a table representing a financial tender transfer database;

FIG. 19 is a table representing a financial tender transfer database;

DESCRIPTION OF THE PREFERRED IMPLEMENTATION

Figure 1:
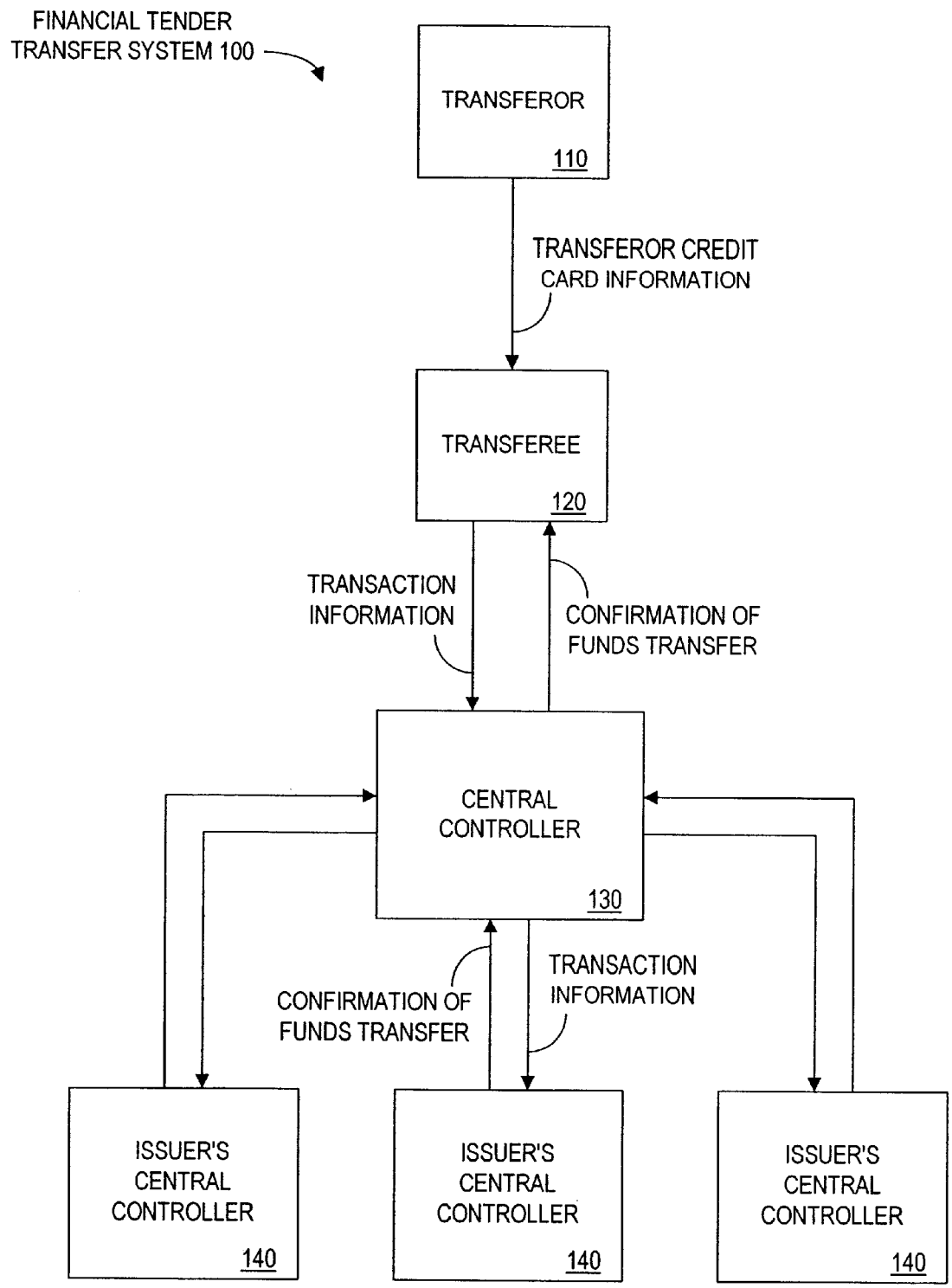
FIG. 1 is a block diagram of an implementation of a financial tender value transferring system consistent with the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

1. Preferred Implementations for Funds Transfers

FIG. 1 is a block diagram of an implementation of a financial tender transfer system 100 consistent with the present invention. This implementation is particularly useful for executing funds transfers, such as between a buyer and a seller of an item, because, as described below, it provides a simple method for making a payment. Financial tender transfer system 100 includes a transferor 110, a transferee 120, a central controller 130, and multiple credit card issuer controllers 140. Financial tender includes funds and/or credit lines. Thus, the transfer of financial tender can refer to the transfer of funds, the transfer of credit, or both.

In a funds transfer, transferor 110 is the buying or paying party. Transferor 110 has his credit card debited by a particular transfer amount to make a purchase or pay off a debt. The transfer amount appears as a conventional transaction entry on their credit card statement, with a corresponding transaction description of the purchase. The transferor's available credit line decreases by the transfer amount. Transferor 110 is liable to pay this amount as a conventional charge. However, the original credit line on the card remains the same.

Transferee 120 is the selling party, or the party getting credit for payment of a debt of transferor 110. The transferee's credit card account is credited for the payment by transferor 110 in essentially the same manner as a credit appears when merchandise is returned. This credit can be used to offset other incurred charges on transferee's account or can be withdrawn from the account as cash at an Automated Teller Machine (ATM). The original credit line remains the same, but the available credit line increases in the same amount as the transfer amount. Credit card issuers 140 issue credit cards and thus give credit to transferor 110 and transferee 120. Although FIG. 1 shows only three credit card issuers, systems consistent with the present invention may be implemented with at least one or more credit card issuers.

Central controller 130 is a credit card financial tender transfer service to facilitate the transaction between transferor 110 and transferee 120. Central controller 130 controls the transfer of financial tender from an account corresponding to the credit card of transferor 110 to an account corresponding to the credit card of transferee 120. This function may be performed by the credit card issuing banks, a credit card processor linked to the credit card issuing banks, a trusted clearing house for credit card funds and/or credit line transfers, or any third party that can access the credit card system to debit one credit card account and credit another given account. Central controller 130 accesses credit card issuers 140 to determine the validity of the credit card accounts, confirm availability of credit, and debit and credit the respective accounts.

Figure 2:
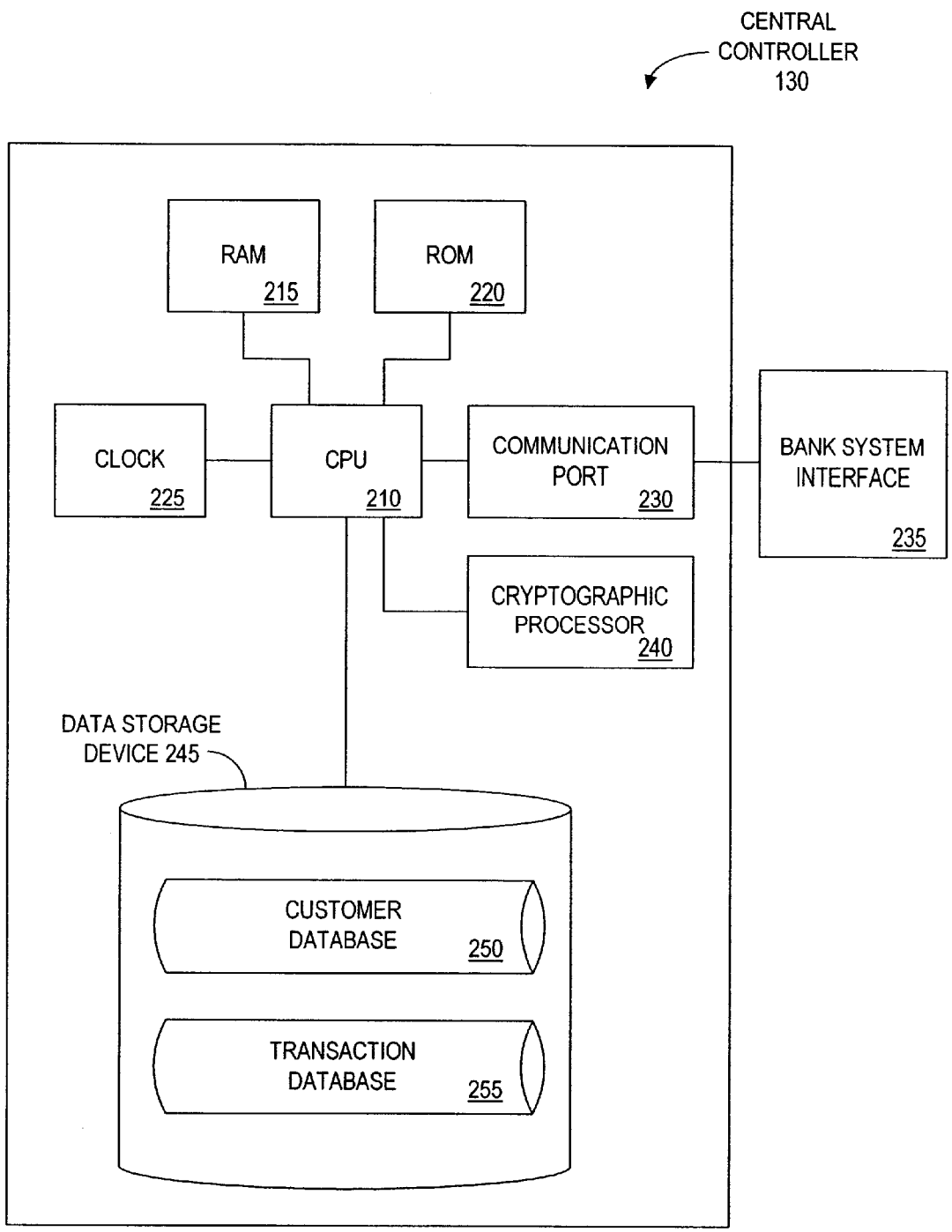
FIG. 2 is a block diagram of a central controller.

FIG. 2 is a detailed block diagram of central controller 130. Central controller 130 includes a microprocessor or central processing unit (CPU) 210 coupled to a random access memory (RAM) 215, a read only memory (ROM) 220, a clock 225, a communication port 230, and a data storage device 245. Communication port 230 couples CPU 210 to a bank system interface 235. Bank system interface 235 couples central controller 130 to credit card issuers 140 (not shown). An optional cryptographic processor 240, such as the MC68HC16 manufactured by Motorola, generates an encrypted identification (ID) number to provide for a secure transaction and applies to implementations described below. Symmetric cryptography is preferably employed. The use of cryptography provides a single use transaction ID that incorporates a date and time into the ID, that in turn guarantees a unique ID for every transaction. The system prevents multiple uses of encrypted transaction IDs by only allowing each unique ID to be used once. Data storage device 245 includes a customer database 250 and a transaction database 255.

Figure 3:
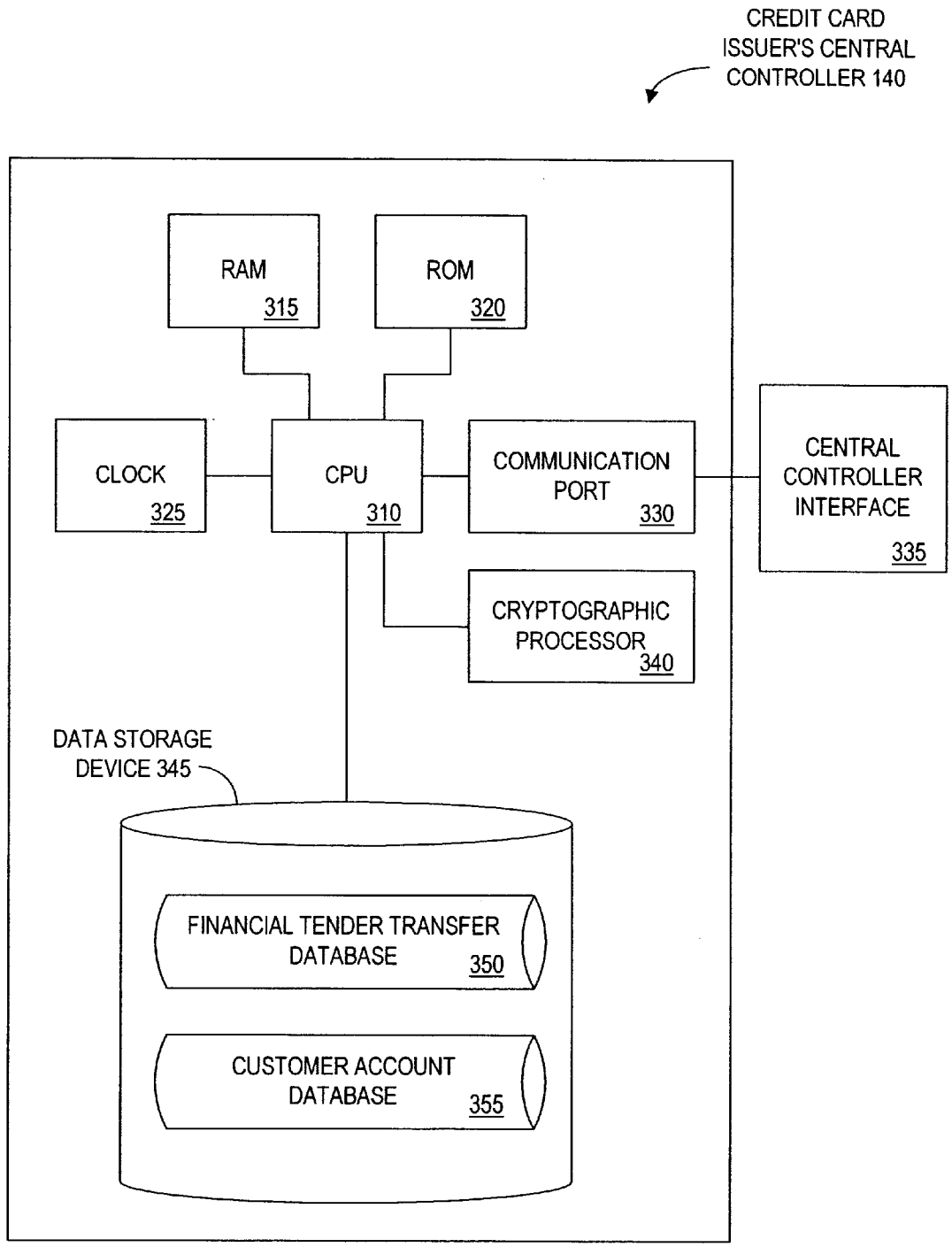
FIG. 3 is a block diagram of a credit card issuer controller.

FIG. 3 is a detailed block diagram of a credit card issuer central controller 300. Credit card issuer central controller 140 includes a microprocessor or CPU 310 coupled to a RAM 315, a ROM 320, a clock 325, a communication port 330, a cryptographic processor 340, and a data storage device 345. Communication port 330 couples CPU 310 to a central controller interface 335. Central controller interface 335 couples credit card issuer central controller 140 to central controller 130 (not shown). Optional cryptographic processor 340 generates an encrypted ID number to provide for a secure transaction. Symmetric cryptography is preferably employed. The use of cryptography provides a single use transaction ID that incorporates a date and time into the ID, that in turn guarantees a unique ID for every transaction. The system prevents multiple uses of encrypted transaction IDs by allowing each unique ID to be used only once. Data storage device 345 includes a financial tender transfer database 350 and customer account database 355.

FIG. 4 is a table illustrating an example of customer database 250. Customer database 250 holds data for each customer registered with central controller 130. The data for each customer includes the customer's name, ID number, credit card type, full credit card number, partial credit card number (last six digits or portion of full number), expiration date, and bank ID number.

FIG. 5 is a table illustrating an example of transaction database 255. Transaction database 255 retains information of each transaction conducted through central controller 130. In particular, the information held in transaction database 255 includes the transaction ID number, time and date of the received transaction, transaction amount, transferor and transferee customer ID numbers, transferor and transferee bank completion codes, and time and date of the completed transaction.

FIG. 6 is a table illustrating an example of credit card holder account database 355. Credit card holder account database 355 records customer information for each credit card holder holding a credit card from the particular credit card issuer 140. The customer information held in credit card holder database 355 includes the customer account number, the name of the customer, the customer's address and telephone number, the original credit line amount, and the available credit line.

FIG. 7 is a table illustrating an example of financial tender transfer database 350. This database holds information for each transaction conducted by a particular credit card issuer 140. The information held includes the transaction ID number, the time and date of the transaction, transaction amount, transaction type, and credit card number.

A. General Funds Transfers

Figure 8A:
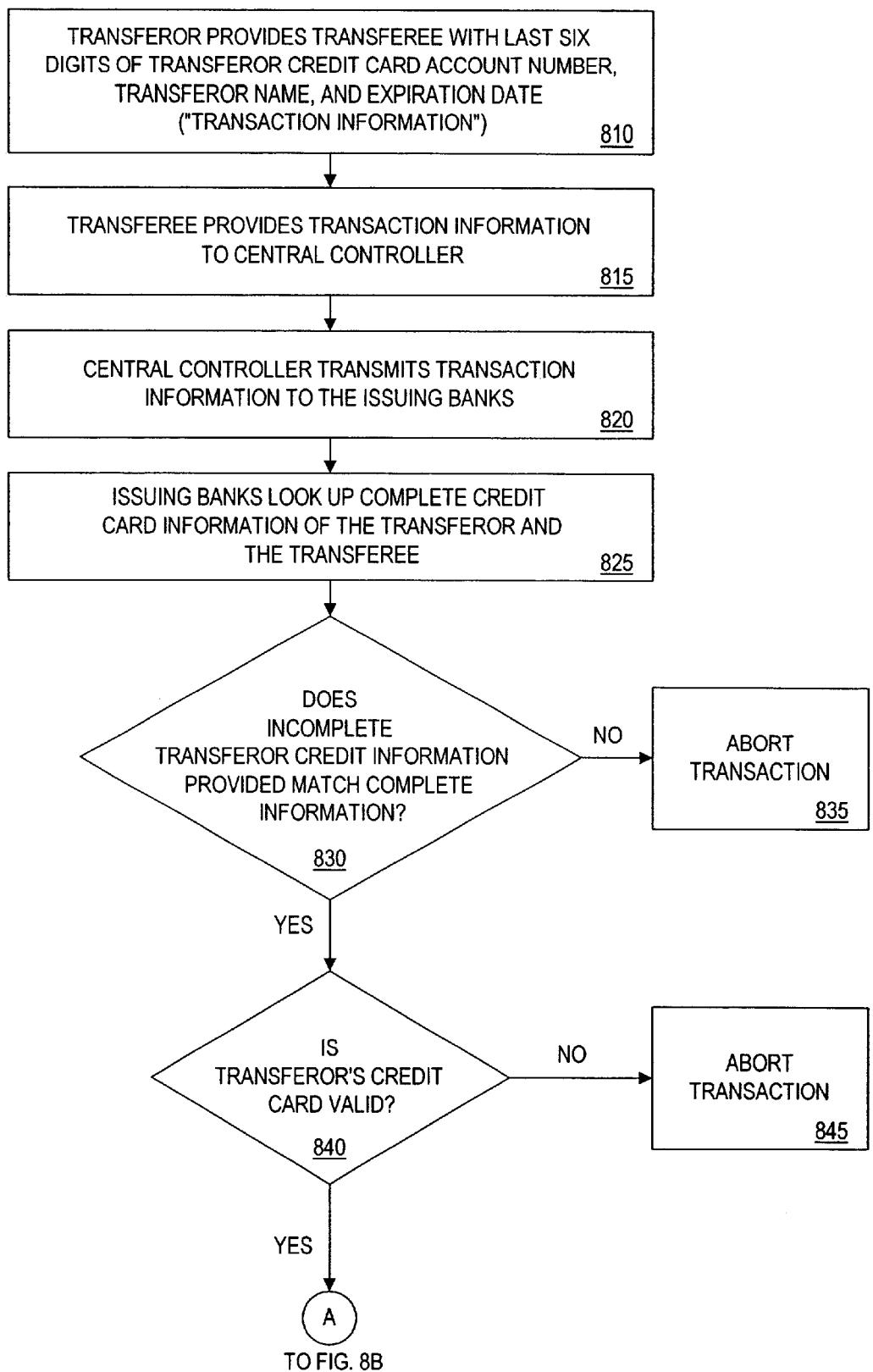
FIGS. 8A and 8B are flowcharts representing the operation of the financial tender value transferring system of FIG. 1.
Figure 8B:
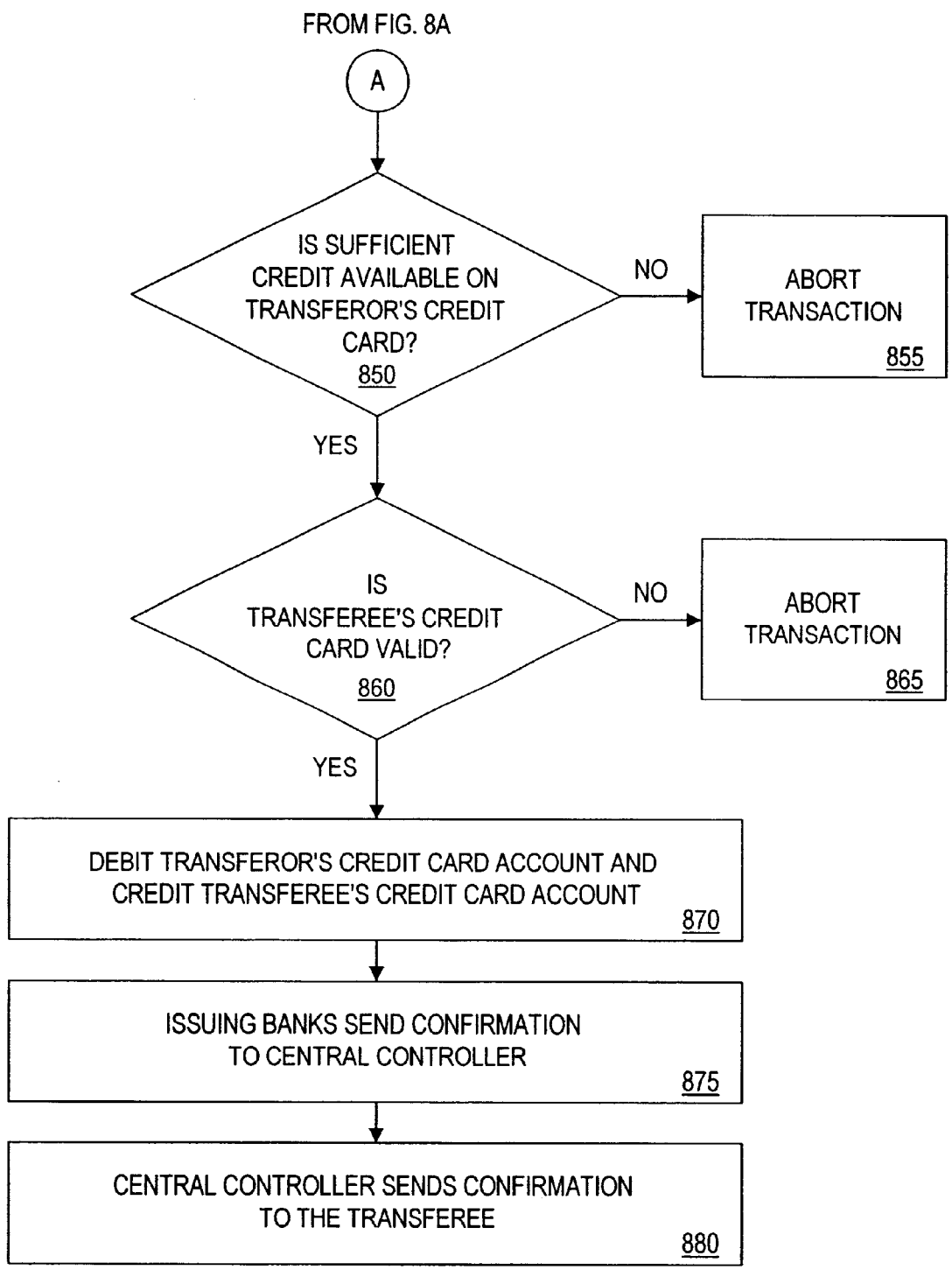

FIGS. 8A and 8B are a flowchart of the steps employed by financial tender transfer system 100 in accordance with the implementation shown in FIG. 1. First, transferor 110 provides transferee 120 the last 6 digits or a specified portion of his credit card account number, his name as it appears on the card, and the expiration date (step 810). Transferee 120 contacts central controller 130 and navigates through a menu, which may be implemented using an Interactive Voice Response Unit (IVRU), to provide transaction information, including the amount to be transferred, the credit card account data from transferor 110, and credit card account information for transferee 120, including credit card account number to be used, and expiration date of the credit card of transferee 120 (step 815). Central controller 130 transmits the transaction information to credit card issuers 140 for transferor 110 and transferee 120 (step 820).

Credit card issuer central controllers 140 for transferor 110 and transferee 120, respectively, execute the transaction in the following steps. First, each looks up the complete credit card information of transferor 110 and transferee 120, respectively (step 825). The credit card issuer central controller 140 for transferor 110 determines whether the partial credit card account number of transferor 110 obtained from central controller 130 corresponds to the information available within its customer account database 355 to correctly identify the transferor's credit card account (step 830). If the information does not match, the transaction is aborted (step 835). Credit card issuer central controller 140 for transferor 110 then verifies the validity of the transferor credit card account (step 840) and aborts the transaction if the transferor credit card account is invalid (step 845), and also confirms that sufficient credit is available in the credit card account of transferor 110 (step 850) and aborts the transaction if transferor 110 has insufficient credit (step 855). Finally, credit card issuer central controller 140 for transferee 120 checks the validity of the credit card of transferee 120 (step 860) and aborts the transaction if it is invalid (step 865).

If the conditions described above are met, credit card issuer central controllers 140 for transferor 110 and transferee 120 debit the transferor's credit card account and credit the transferee's credit card account, respectively. In particular, transferor's available credit line decreases by the transfer amount for which transferor 110 is liable to pay as a conventional charge. In addition, the transfer amount appears as a credit in transferee's credit account such that transferee's available credit line increases in the same amount as the transfer amount. Each credit card issuer central controller 140 also reflects the result of the transaction in its respective financial tender transfer database 350 (step 870). Credit card issuer central controllers 140 for transferor 110 and transferee 120 then send confirmations to central controller 130 that the transaction has been executed (step 875). Central controller 130 subsequently sends a confirmation to transferee 120 that the transaction has been executed (step 880). Central controller 130 also updates transaction database 255 with the transaction information.

This implementation provides a simple method for executing the funds transfer between transferor 110 and transferee 120. In particular, only one party needs to access central controller 130. In addition, the transferee cannot repudiate the transaction because the transaction is executed when transferee 120 contacts central controller 130. For example, transferor 110 is required to provide transferee 120 with a specified portion of transferor's credit card number. Alternative implementations described below provide additional security features.

B. Payment of Debt

Figure 9:
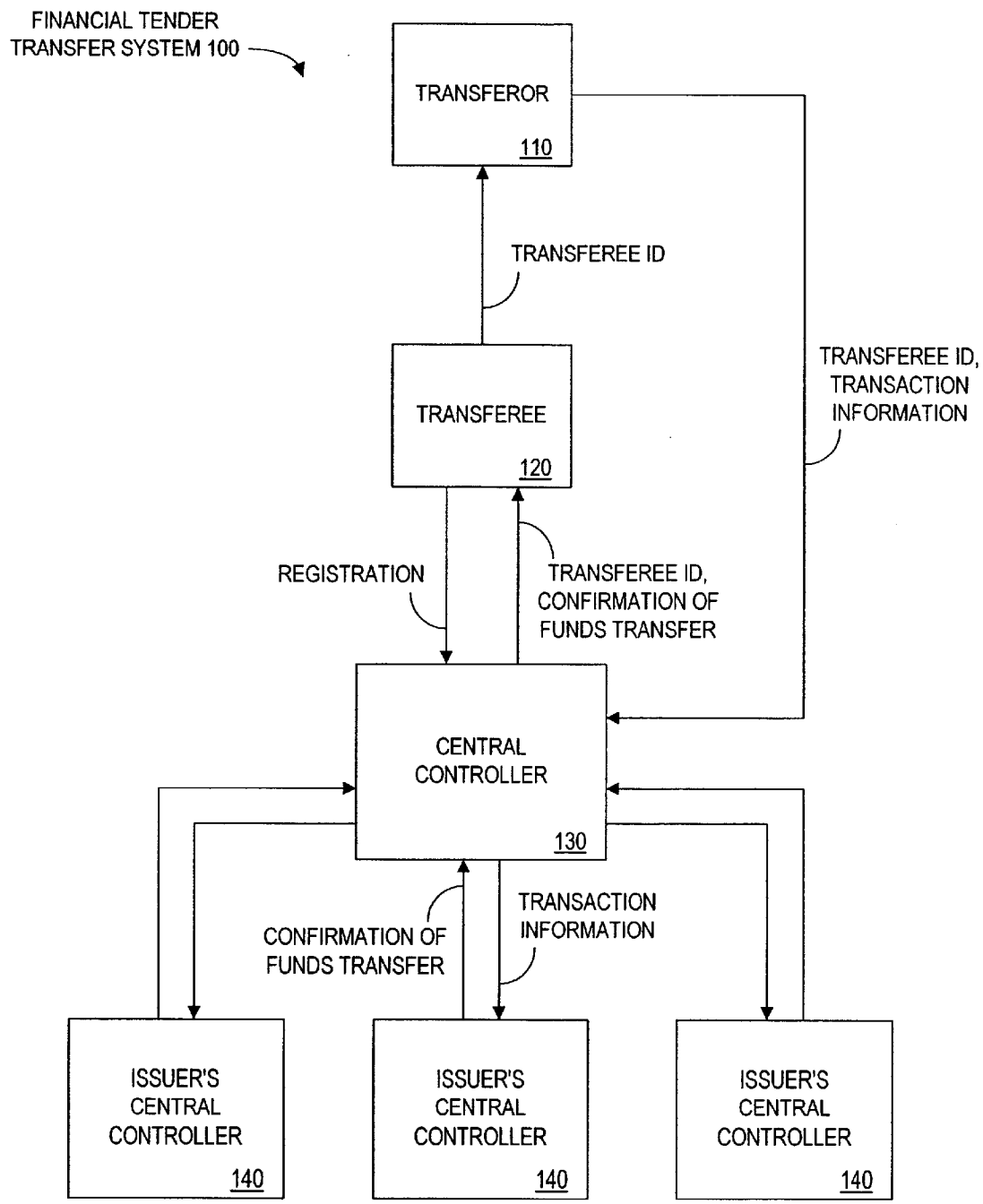
FIG. 9 is a block diagram of another implementation of a financial tender value transferring system consistent with the present invention.

FIG. 9 is a block diagram of another implementation of financial tender transfer system 100 consistent with the invention. This implementation is preferably practiced in cases where a transferee is owed money by a transferor and provides enhanced security features by eliminating the need for either party to provide credit card information to the other party. As an alternative to writing a check to the transferee, the transferor settles his debt by receiving an identification number from the transferee and calling, for example, a toll free number to access central controller 130 to conduct the transaction described below with reference to FIGS. 10A and 10B. Similar to FIG. 1, financial tender transfer system 100 of FIG. 9 includes a transferor 110, a transferee 120, a central controller 130, and multiple credit card issuers 140.

Figure 10A:
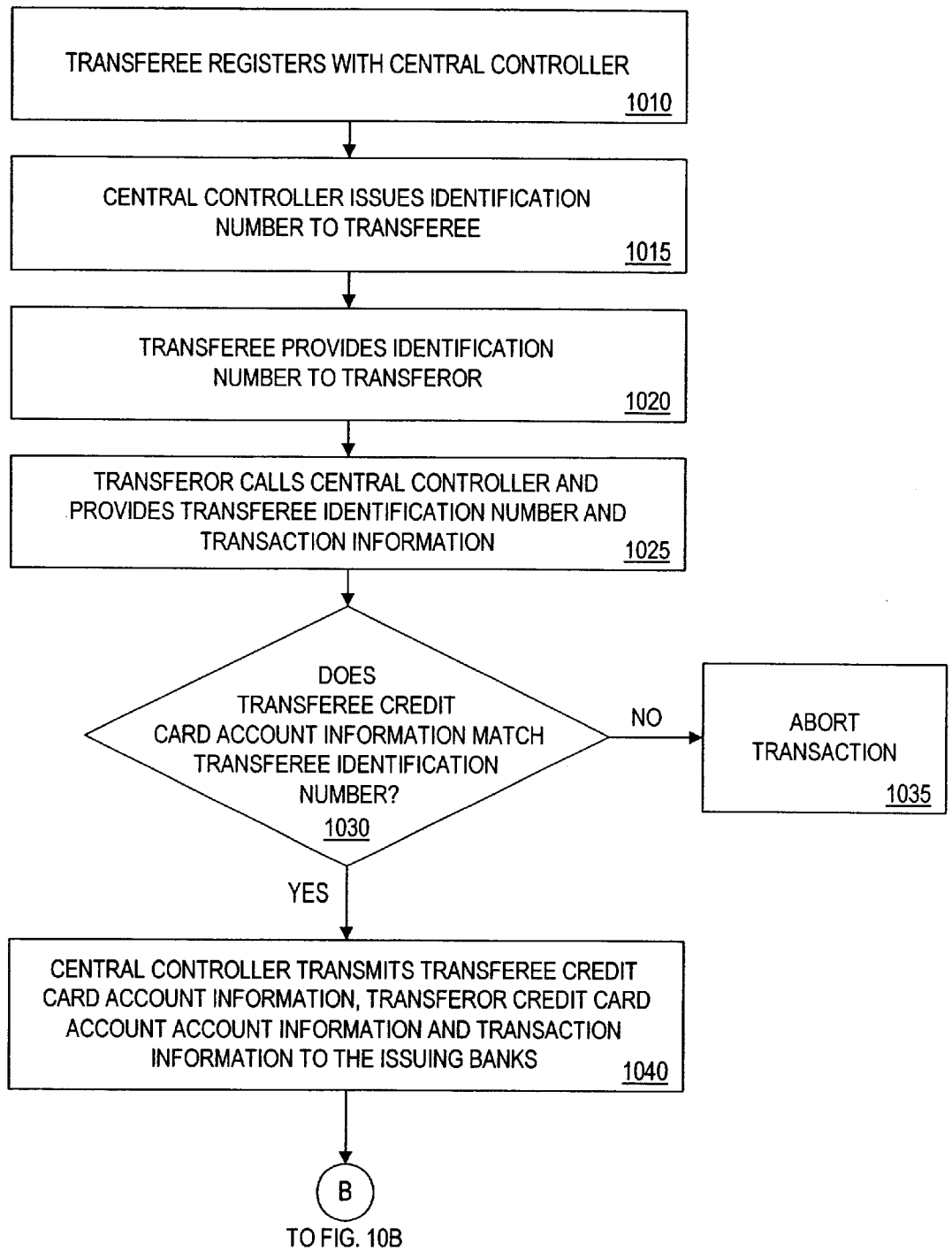
FIGS. 10A and 10B are flowcharts representing the operation of the financial tender value transferring system of FIG. 9.
Figure 10B:
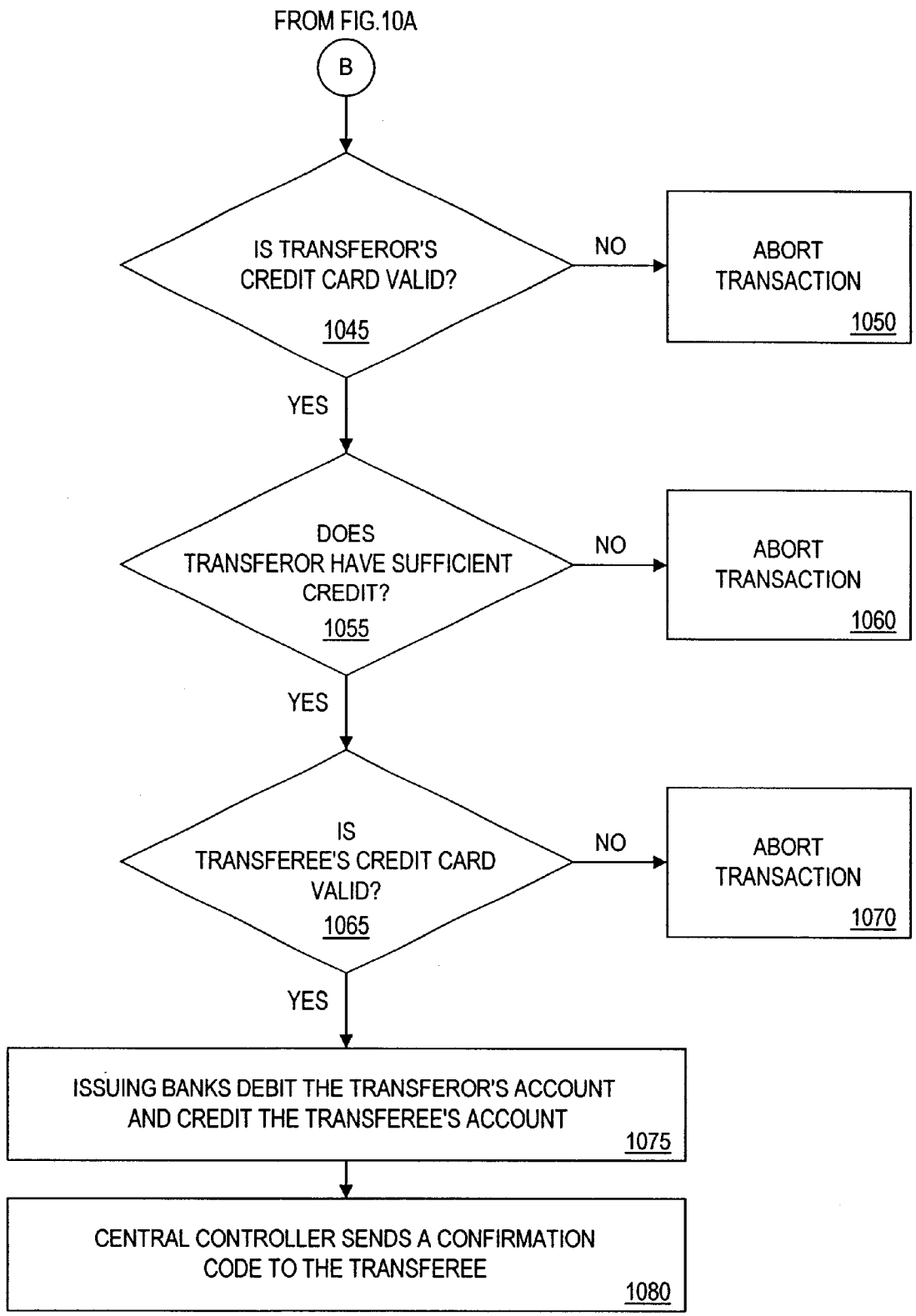

FIGS. 10A and 10B are a flowchart of the steps employed by financial tender transfer system 100 in accordance with the implementation shown in FIG. 9. First, transferee 120 registers with central controller 130 operated by a trusted third party by providing it with relevant credit card information including the transferee's name and the transferee's credit card number and expiration date (step 1010). Central controller 130 records this information in customer database 250 and issues a Transferee Identification (ID) Number to transferee 120 (step 1015). Transferee 120 then provides this Transferee ID Number to transferor 110 (step 1020). After receiving the Transferee ID Number, transferor 110 contacts central controller 130 and navigates through a menu to provide transaction information, including the amount to be transferred, the credit card account information for transferor 110, including name, credit card number, and expiration date, and the Transferee ID Number (step 1025).

Central controller 130 looks up and matches the transferee credit card account information with the Transferee ID Number in customer database 250 (step 1030) and aborts the transaction if the information fails to match (step 1035). Central controller 130 then transmits the identified transferee credit card information along with the above transferor credit card information and the transaction information of transferor 110 and transferee 120 to credit card issuers 140 for transferor 110 and transferee 120 (step 1040).

After receiving the information from central controller 130, credit card issuer central controllers 140 for transferor 110 and transferee 120, respectively, execute the transaction in the following steps. First, credit card issuer central controller 140 for transferor 110 verifies the validity of the transferor's credit card account (step 1045) and aborts the transaction if it is invalid (step 1050). Credit card issuer central controllers 140 for transferor 110 also determines if transferor 110 has sufficient credit (step 1055) and aborts the transaction if transferor 110 lacks sufficient credit (step 1060). Finally, credit card issuer 140 for transferee 120 verifies the validity of the transferee's credit card account (step 1065) and aborts the transaction if it is invalid (step 1070).

Assuming the transaction is valid, credit card issuer central controllers 140 for transferor 110 and transferee 120 debit the transferor's credit card account and credit the transferee's credit card account, respectively. In particular, transferor's available credit line decreases by the transfer amount for which transferor 110 is liable to pay as a conventional charge. In addition, the transfer amount appears as a credit in transferee's credit account such that transferee's available credit line increases in the same amount as the transfer amount. Each credit card issuer central controller 140 also updates its respective financial tender transfer database 350 to reflect the completed transaction (step 1075). Credit card issuer central controllers 140 for transferor 110 and transferee 120 then confirm the transaction with central controller 130, which in turn sends a confirmation to transferee 120 that the transaction has been executed (step 1080). Central controller 130 also records the transaction information in transaction database 255.

This implementation provides more security than the implementation described in connection with FIG. 1. For example, neither party needs to provide any portion of a credit card number to the other party. Also, since transferor 110 executes the transaction, transferee 120 will be unable to overcharge transferor 110 by transferring more than the agreed upon funds.

C. Purchase of Goods or Services

Figure 11:
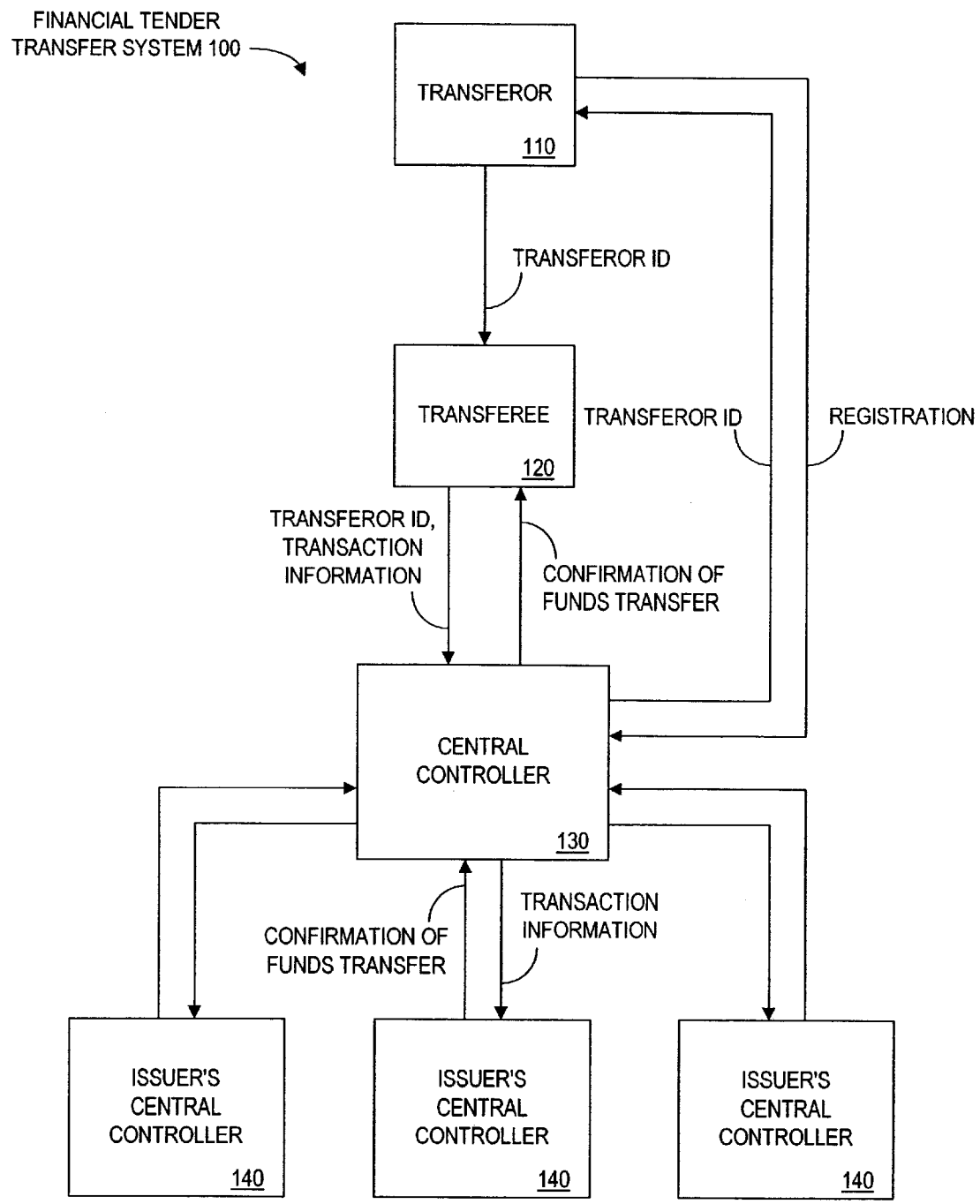
FIG. 11 is a block diagram of another implementation of a financial tender value transferring system consistent with the present invention.

FIG. 11 is a block diagram of another implementation of financial tender transfer system 100. This implementation is preferably practiced in cases where transferor 110 is buying goods or services from transferee 120 and also provides enhanced security features by eliminating the need for either party to provide credit card information to the other party. As an alternative to providing a portion of credit card number to transferee 120, transferor 110 provides a Transferor ID Number to transferee 120 and transferee 120 contacts central controller 130 by, for example, calling a toll free number, to conduct the transaction described below with reference to FIGS. 12A and 12B. Like FIG. 1, financial tender transfer system 100 of FIG. 11 includes a transferor 110, a transferee, 120, a central controller 130, and a plurality of credit card issuers 140.

Figure 12A:
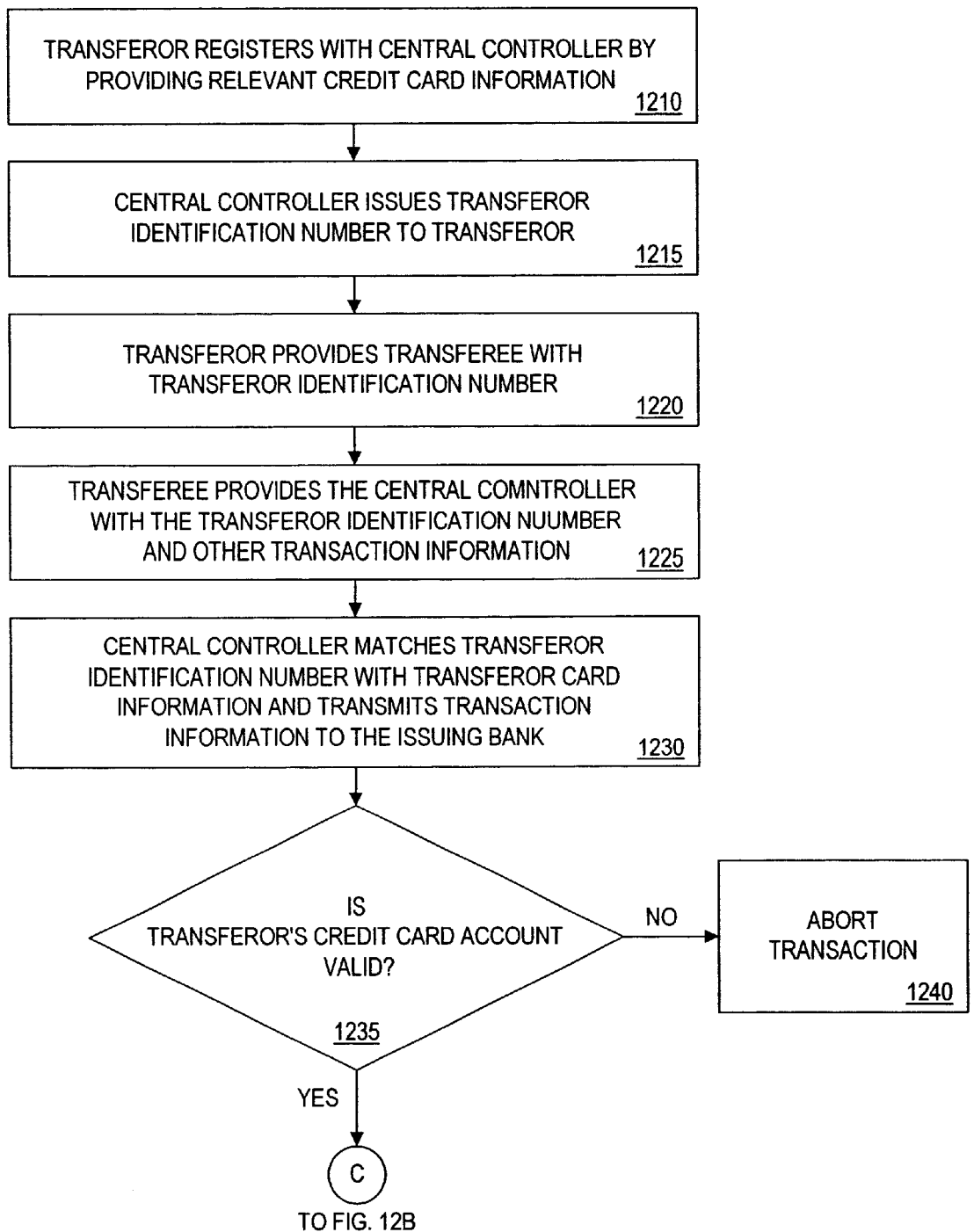
FIGS. 12A and 12B are flowcharts representing the operation of the financial tender value transferring system of FIG. 11.
Figure 12B:
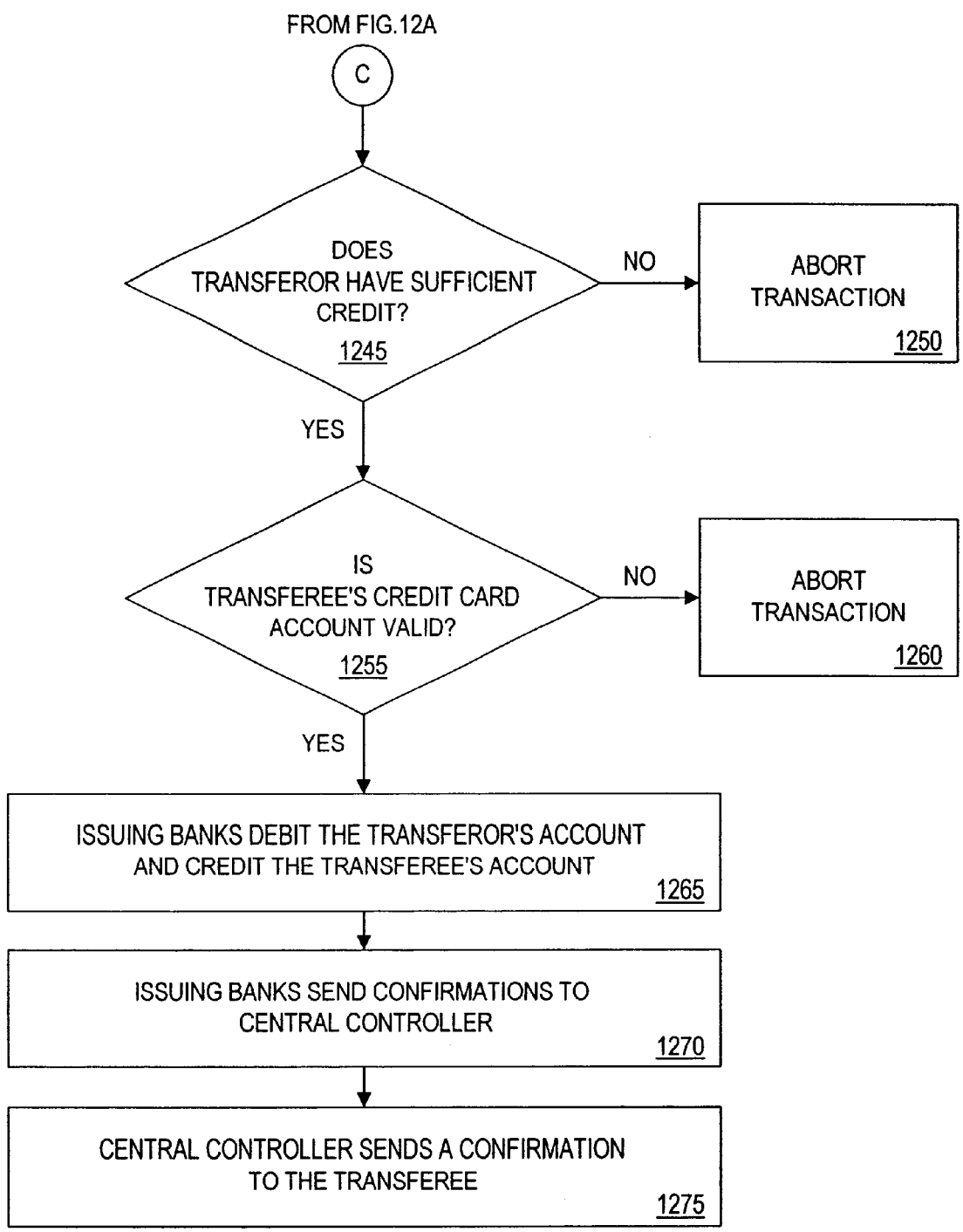

FIGS. 12A and 12B are a flowchart of the steps employed by financial tender transfer system 100 in accordance with the implementation shown in FIG. 11. First, transferor 110 registers with central controller 130 operated by a trusted third party by providing it with relevant credit card information, including transferor's name and transferor's credit card number and expiration date (step 1210). Central controller 130 records this information in customer database 250 and issues a Transferor Identification Number (ID Number) to transferor 110 (step 1215). Transferor 110 then provides transferee 120 with the Transferor ID Number (step 1220). Transferee 120 subsequently contacts central controller 130 and navigates through a menu to provide the transaction information, including the amount to be transferred, the Transferor ID Number, and the credit card account information for transferee 120, including name, credit card number, and expiration date (step 1225). Central controller 130 identifies and matches the transferor credit card account information with the transferor ID Number in customer database 250, and transmits the identified transferor credit card information along with the above transferee credit card information and the transaction information of transferor 110 and transferee 120 to credit card issuers 140 for transferor 110 and transferee 120 (step 1230).

After receiving the information from central controller 130, credit card issuers 140 for transferor 110 and transferee 120, respectively, execute the transaction in the following steps. First, credit card issuer 140 for transferor 110 verifies the validity of the transferor's credit card account (step 1235) and aborts the transaction if it is invalid (step 1240). Credit card issuer 140 for transferor 110 also determines if transferor 110 has sufficient credit (step 1245) and aborts the transaction if transferor 110 lacks sufficient credit (step 1250). Finally, credit card issuer 140 for transferee 120 verifies the validity of the transferee's credit card account (step 1255) and aborts the transaction if it is invalid (step 1260).

Assuming the transaction is valid, credit card issuers 140 for transferor 110 and transferee 120 debit the transferor's credit card account and credit the transferee's credit card account, respectively. In particular, transferor's available credit line decreases by the transfer amount for which transferor 110 is liable to pay as a conventional charge. In addition, the transfer amount appears as a credit in transferee's credit account such that transferee's available credit line increases in the same amount as the transfer amount. Each credit card issuer 140 also updates its respective financial tender transfer database 350 to reflect the completed transaction (step 1265). Credit card issuers 140 for transferor 110 and transferee 120 then confirm the transaction with central controller 130 (step 1270), which sends a confirmation to transferee 120 that the transaction has been executed (step 1275). Central controller 130 also updates transaction database 255 to reflect the transaction. As explained above, this implementation also provides more security than the implementation described in connection with FIG. 1 since neither party provides any portion of a credit card number to the other party.

D. Secure Transactions

Figure 13:
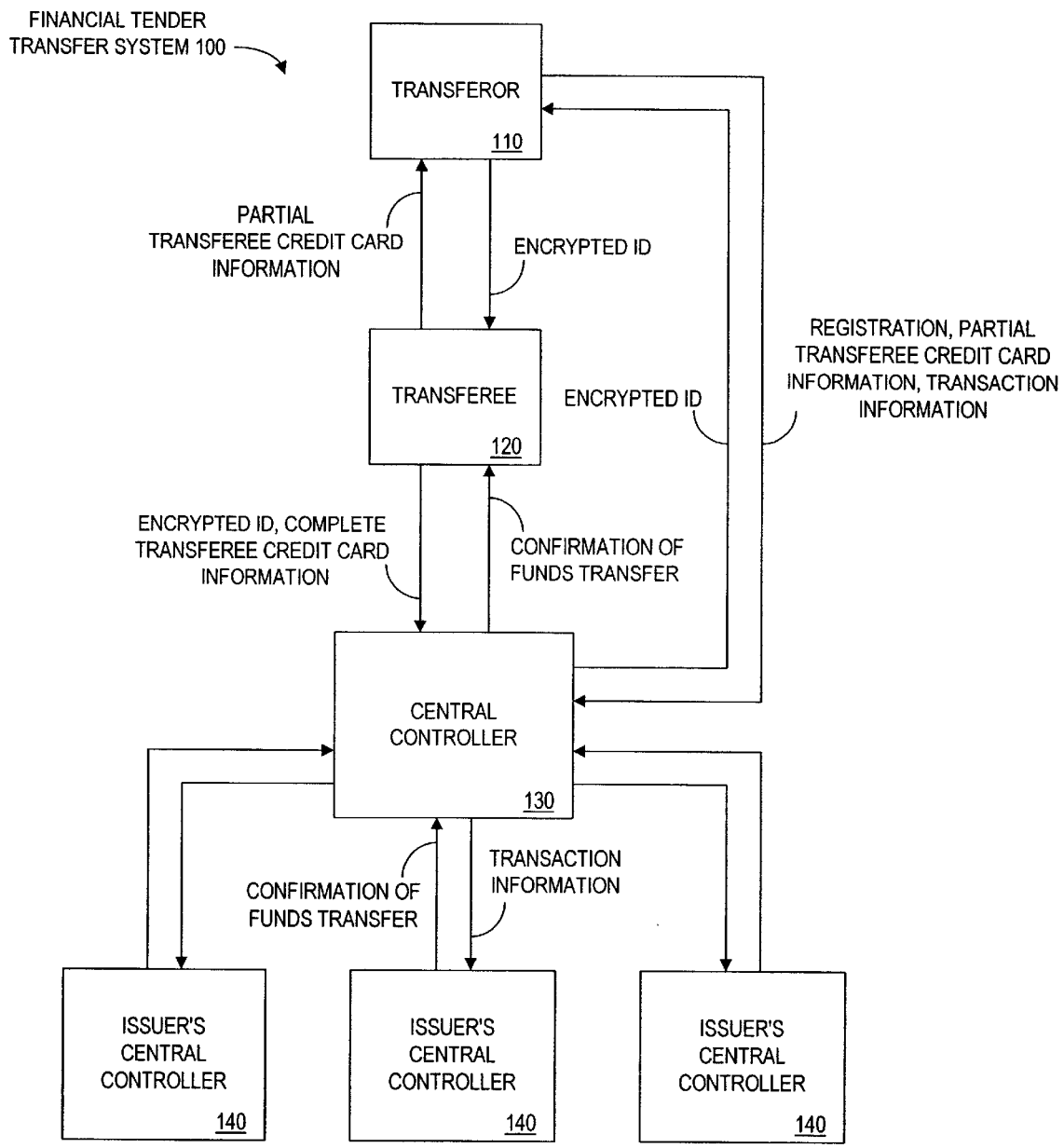
FIG. 13 is a block diagram of another implementation of a financial tender value transferring system consistent with the present invention.

FIG. 13 is a block diagram of another implementation of financial tender transfer system 100. This implementation is preferably practiced for transactions between transferor 110 and transferee 120 that require a high level of security because it provides a cryptographically secure, non-reputable, authenticatable credit card funds and/or credit line transfer from transferor 110 to transferee 120 via central controller 130. Like FIG. 1, financial tender transfer system 100 of FIG. 13 includes a transferor 110, a transferee 120, a central controller 130, and a plurality of credit card issuers 140.

Figure 14A:
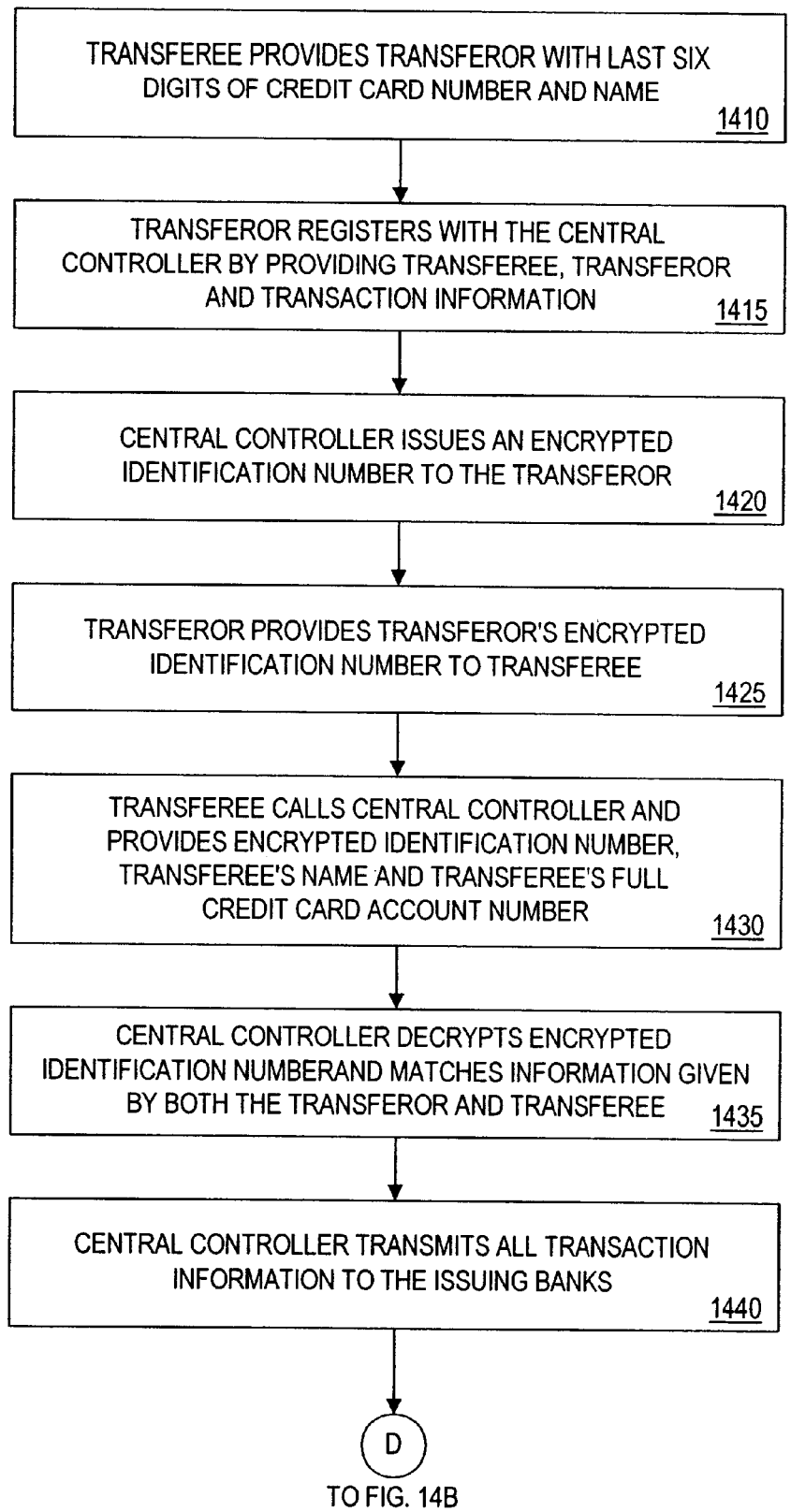
FIGS. 14A and 14B are flowcharts representing the operation of the financial tender value transferring system of FIG. 13.
Figure 14B:
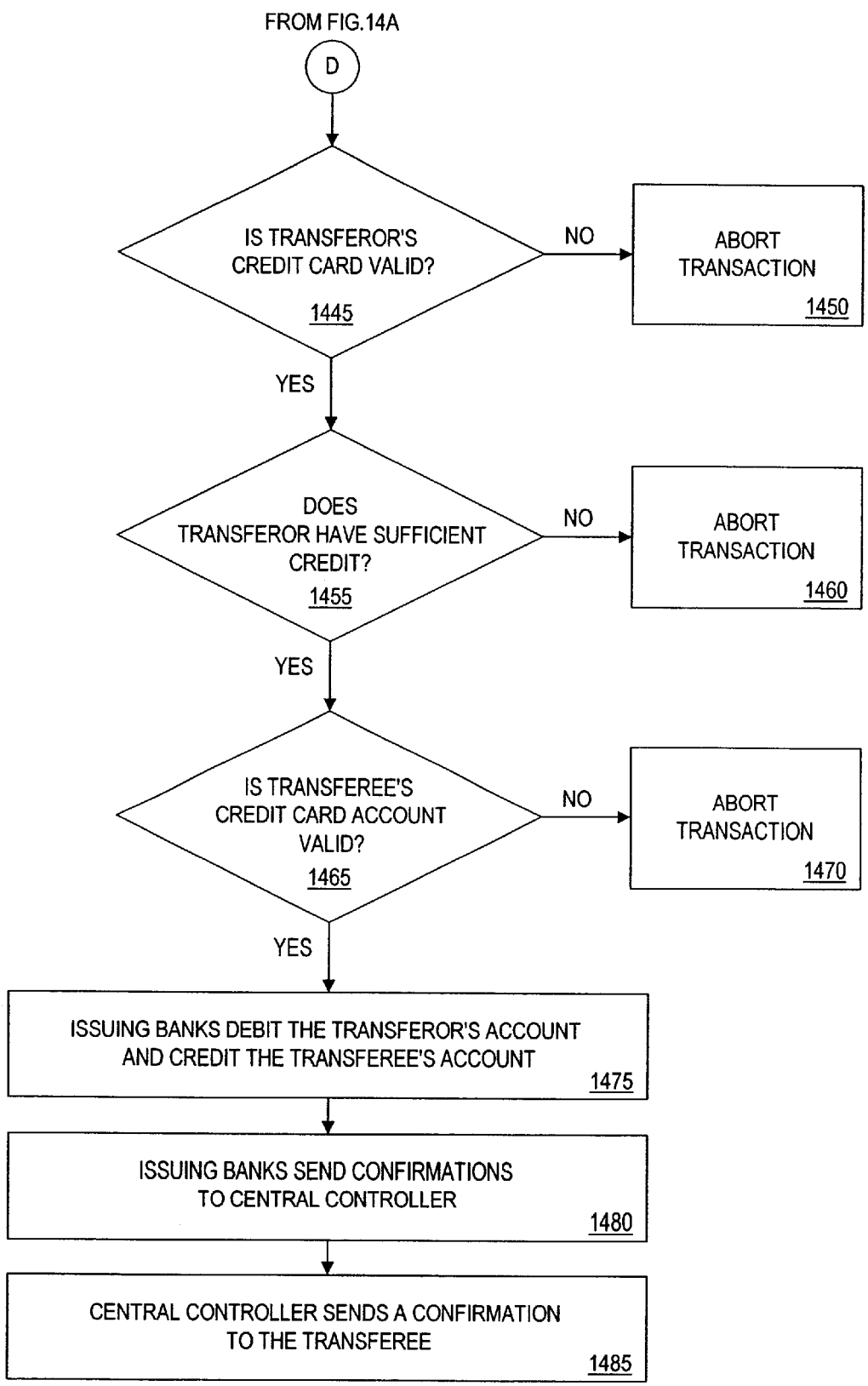

FIGS. 14A and 14B are a flowchart of the steps employed by financial tender transfer system 100 in accordance with the implementation shown in FIG. 13. First, transferee 120 provides transferor 110 with the last 6 digits or some specified portion of his credit card number, his name, and the name of transferee's credit card issuer (step 1410). Transferor 110 registers the credit card transaction to be effected with central controller 130 operated by a trusted third party by providing it with information including transferor information, such as transferor's name, transferor's credit card account number and expiration date, transferee information, such as transferee's name and the last 6 digits of transferee's credit card account number, and the transaction information, such as the amount to transfer. The date and time of registration are also recorded by central controller 130 (step 1415). Central controller 130 records the transferor information in customer database 250 and issues an encrypted Identification Number (ID Number), to transferor 110 (step 1420). This encrypted ID Number contains all the information provided to central controller 130 including the date and time information. The encrypted ID Number denotes the intention of transferor 110 to pay the transfer amount to transferee 120. The ID Number is encrypted by using a cryptographic key (issuer key) available to all issuers participating in the system. Any conventional cryptography protocol can be used. The practice of using cryptographic protocols to ensure the authenticity of senders as well as the integrity of messages is well known in the art and need not be described here in detail. For reference, one of ordinary skill in the art may refer to Bruce Schneier, Applied Cryptography, Protocols, Algorithms, And Source Code In C, (2d Ed, John Wiley & Sons, Inc., 1996). Alternatively, central controller 130 may issue a non-encrypted ID Number that is preferably a pointer to all the information given to central controller 130.

Transferor 110 provides transferee 120 with the encrypted ID Number (step 1425). Transferee 120 then contacts central controller 130 and provides the encrypted ID Number and transferee's name and transferee's full credit card account number (step 1430). Central controller 130 decrypts the ID Number with the issuer key and matches the decrypted name of transferee 120 and the last 6 digits of transferee's credit card with information input by transferee 120 (step 1435). Central controller 130 then transmits the identified transferee credit card information along with the above transferor credit card information and the transaction information of transferor 110 and transferee 120 to credit card issuers 140 for transferor 110 and transferee 120 (step 1440).

After receiving the information from central controller 130, credit card issuer central controllers 140 for transferor 110 and transferee 120, respectively, execute the transaction in the following steps. First, credit card issuer central controller 140 for transferor 110 verifies the validity of the transferor's credit card account (step 1445) and aborts the transaction if it is invalid (step 1450). Credit card issuer central controller 140 for transferor 110 also determines if transferor 110 has sufficient credit (step 1455) and aborts the transaction if transferor 110 lacks sufficient credit (step 1460). Finally, credit card issuer central controller 140 for transferor 120 verifies the validity of the transferee's credit card account (step 1465) and aborts the transaction if it is invalid (step 1470).

Assuming the transaction is valid, credit card issuer central controllers 140 for transferor 110 and transferee 120 debit the transferor's credit card account and credit the transferee's credit card account, respectively (step 1475). In particular, transferor's available credit line decreases by the transfer amount for which transferor 110 is liable to pay as a conventional charge. In addition, the transfer amount appears as a credit in transferee's credit account such that transferee's available credit line increases in the same amount as the transfer amount. Each credit card issuer 140 also updates its respective financial tender transfer database 350 to reflect the completed transaction. Credit card issuers 140 for transferor 110 and transferee 120 then confirm the transaction with central controller (step 1480), which sends a confirmation to transferee 120 that the transaction has been executed (step 1485). Central controller 130 also updates transaction database 255 to reflect the completed transaction.

In this implementation, transferee 120 cannot misuse the transferor's ID Number by repeating the transaction multiple times because the Transferor ID Number is a single use, transaction specific ID Number which incorporates the date, the time, and the amount of the transaction. At the same time, transferor 110 cannot repudiate intent to pay once transferor 110 gives the ID Number to transferee 120. Hence, the transaction is limited to a one-time use because the ID Number is a proxy for an authorization to transferee 120 to effect a deposit of the transaction amount into the designated transferee credit card account. The ID Number is useful only to transferee 120 because of the matching performed by central controller 140. Hence, this is a secure transaction.

In any of the above implementations, transaction information can also be exchanged via the Internet. When the Internet is used, transferee 120 or transferor 110 access central controller 130 through a web-site to input transaction information via a secure Internet transmission protocol to enable financial tender transactions, such as the transfer of funds and/or credit line amounts, as described above. Transaction: information transmitted between central controller 130 and the issuing banks may be encrypted for security. In all cases, any issuing bank can abort a transaction because of the various verifications that are performed. The abort transaction information is transmitted to central controller 130 which then transmits this information to the transferee/transferor.

2. Preferred Implementations for Credit Line Transfers

In addition to funds transfers for debiting and crediting a transferor and transferee account, respectively, systems consistent with the present invention can also execute credit line transfers. In a credit line transfer, the transfer amount appears as a conventional transaction entry in transferor's account, with a transaction description stating "credit line transfer to transferee's account." In contrast to a funds transfer, transferor's available credit line and transferor's original credit line decrease by the transfer amount. Transferor 110 may be charged a service fee, but otherwise no charge is incurred.

The transfer amount is added to the original credit line of transferee's account. Thus, the available credit line increases in the same amount as the transfer amount. If transferee 120 defaults or becomes bankrupt, transferee's credit card issuer can claim up to the credit line transfer amount from transferor's credit card issuer, who then claims the same from transferor 110. While the credit line increases, there is no dollar credit applied as with the funds transfer situation described above.

The credit line transfers will be for a certain dollar amount and a specified time. After the specified time, the credit line transferred will automatically revert to the original transferor. When the transfer is made, transferee 120 has the option to use the transferred credit line. Transferee's credit card issuer can track the usage on the original authorized credit line and the transferred credit line either jointly or separately and reflect the same on a monthly billing statement to transferee 120.

A. Secure Transactions

Figure 15:
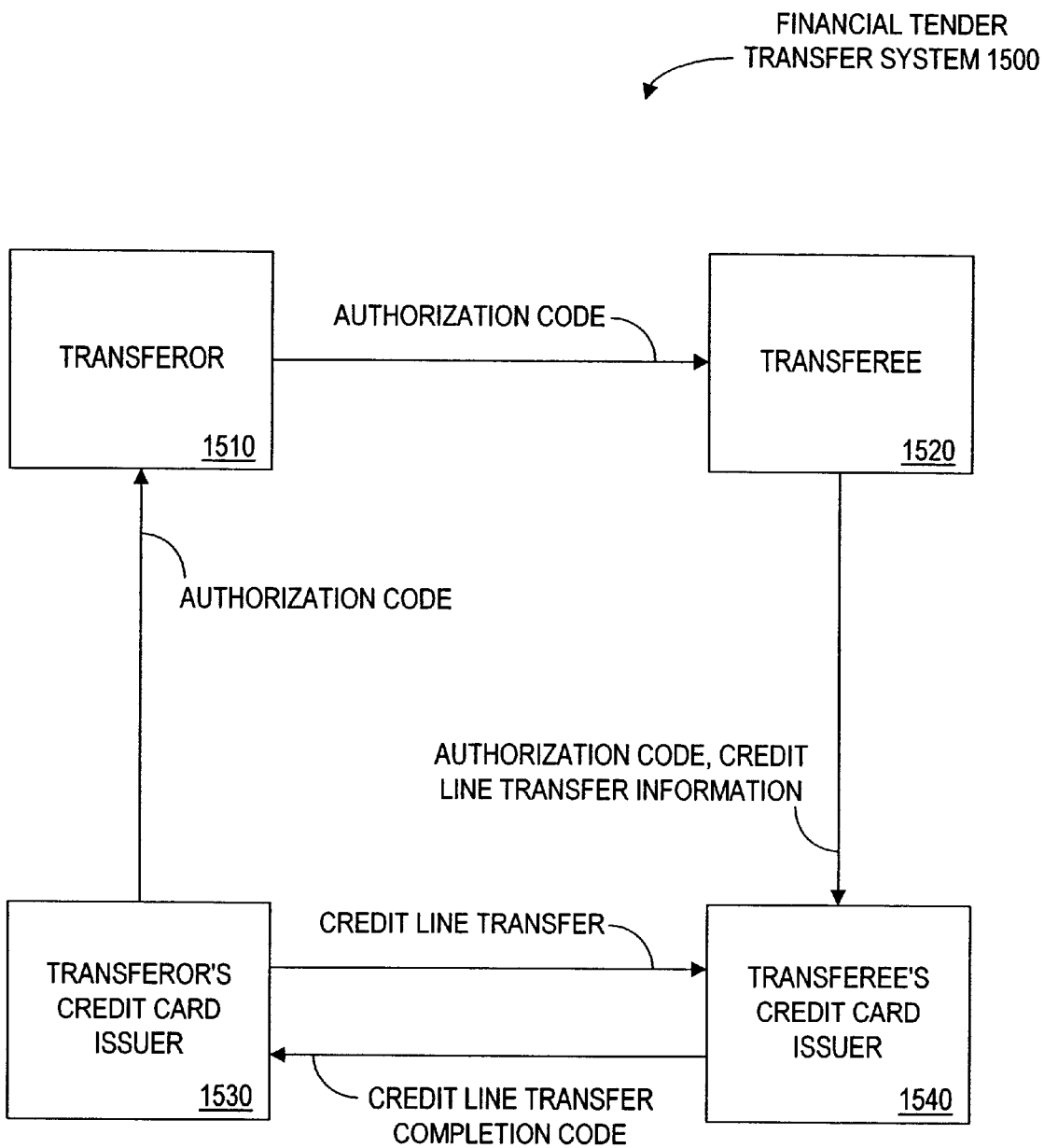
FIG. 15 is a block diagram of an implementation of a financial tender value transferring system consistent with the present invention.

FIG. 15 is a block diagram of an implementation of a financial tender transfer system 1500 consistent with the invention. This implementation is preferably practiced for credit line transfers, as well as funds transfers, between transferor 1510 and transferee 1520 that require a high level of security because it provides a cryptographically secure, non-repudiatable, authenticatable credit line transfer from transferor 1510 to transferee 1520. Financial tender transfer system 1500 includes a transferor 1510, a transferee 1520, a transferor's credit card issuer 1530, and transferee's credit card issuer 1540. In this implementation, the functions of central controller 130 of financial tender transfer system 100 are incorporated into both transferor's credit card issuer 1530 and transferee's credit card issuer 1540. As a result, the aforementioned functions performed by central controller 130 are assumed by transferor's credit card issuer 1530 and transferee's credit card issuer 1540, either solely or in combination, depending on the steps used for conducting a transfer of financial tender.

Figure 16:
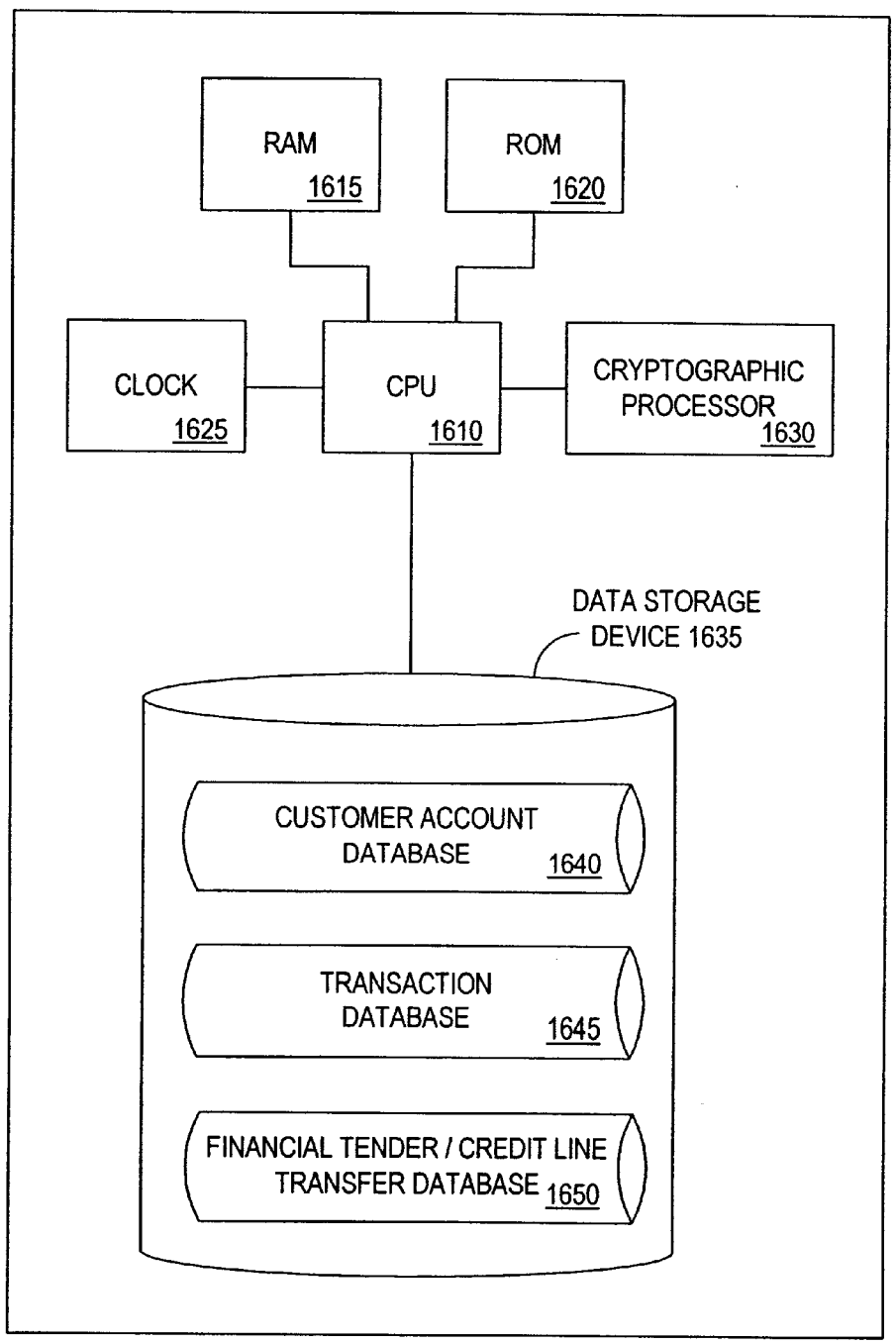
FIG. 16 is a block diagram of another implementation of a credit card issuer controller.

FIG. 16 is a detailed block diagram of a credit card issuer controller 1600 employed by transferor's credit card issuer 1530 and transferee's credit card issuer 1540. Credit card issuer controller 1600 includes a microprocessor or CPU 1610 coupled to a RAM 1615, a ROM 1620, a clock 1625, a cryptographic processor 1630, and a data storage device 1635. Cryptographic processor 1630 encrypts the ID number with the issuer key for the secure transaction described above. Data storage device 1635 includes a customer account database 1640, a transaction database 1645, and a financial tender/credit line transfer database 1650.

Figure 17:
FIG. 17 is a table representing a customer account database.

FIG. 17 is a table illustrating an example of customer account database 1640. Customer account database 1640 holds data for each customer registered with credit card issuer controller 1600. The data for each customer includes the customer account number, the customer's name, address, and phone number, the original credit line, and the available credit line.

Figure 18:
FIG. 18 is a table representing a transaction database.

FIG. 18 is a table illustrating an example of a conventional transaction database 1645. Transaction database 1645 retains information of each transaction conducted through credit card issuer controller 1600. In particular, the information in transaction database 1645 includes the customer account number, the date and time of the transaction, the transaction amount, the merchant identification number, and the name of the merchant.

FIG. 19 is a table illustrating an example of financial tender transfer database 1650. Financial tender transfer database 1650 records all information related to a credit line transfer to or from a credit cardholder holding a credit card from the credit card issuer associated with credit card issuer controller 1600. The credit line transfer information in credit line transfer database 1650 includes the credit card number, the credit line transfer amount, the authorization code, the completion code, the corresponding account number for which the transferred credit line is credited or debited, and the transaction type. A positive dollar amount in the credit line transfer amount indicates an amount credited to the customer account number, whereas a negative dollar amount indicates an amount debited.

Figure 20A:
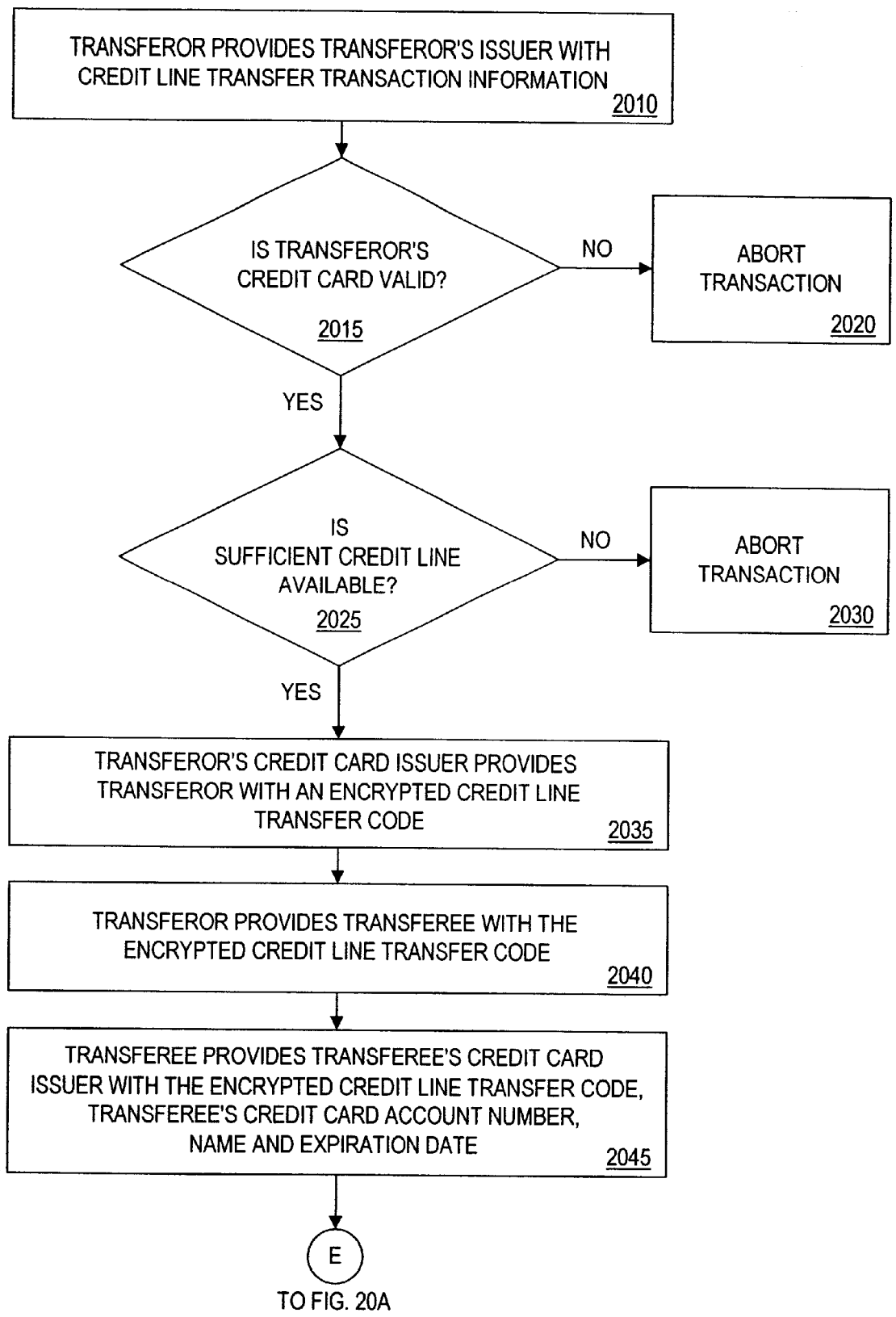
FIGS. 20A and 20B are flowcharts representing the operation of the financial tender value transferring system of FIG. 15.
Figure 20B:
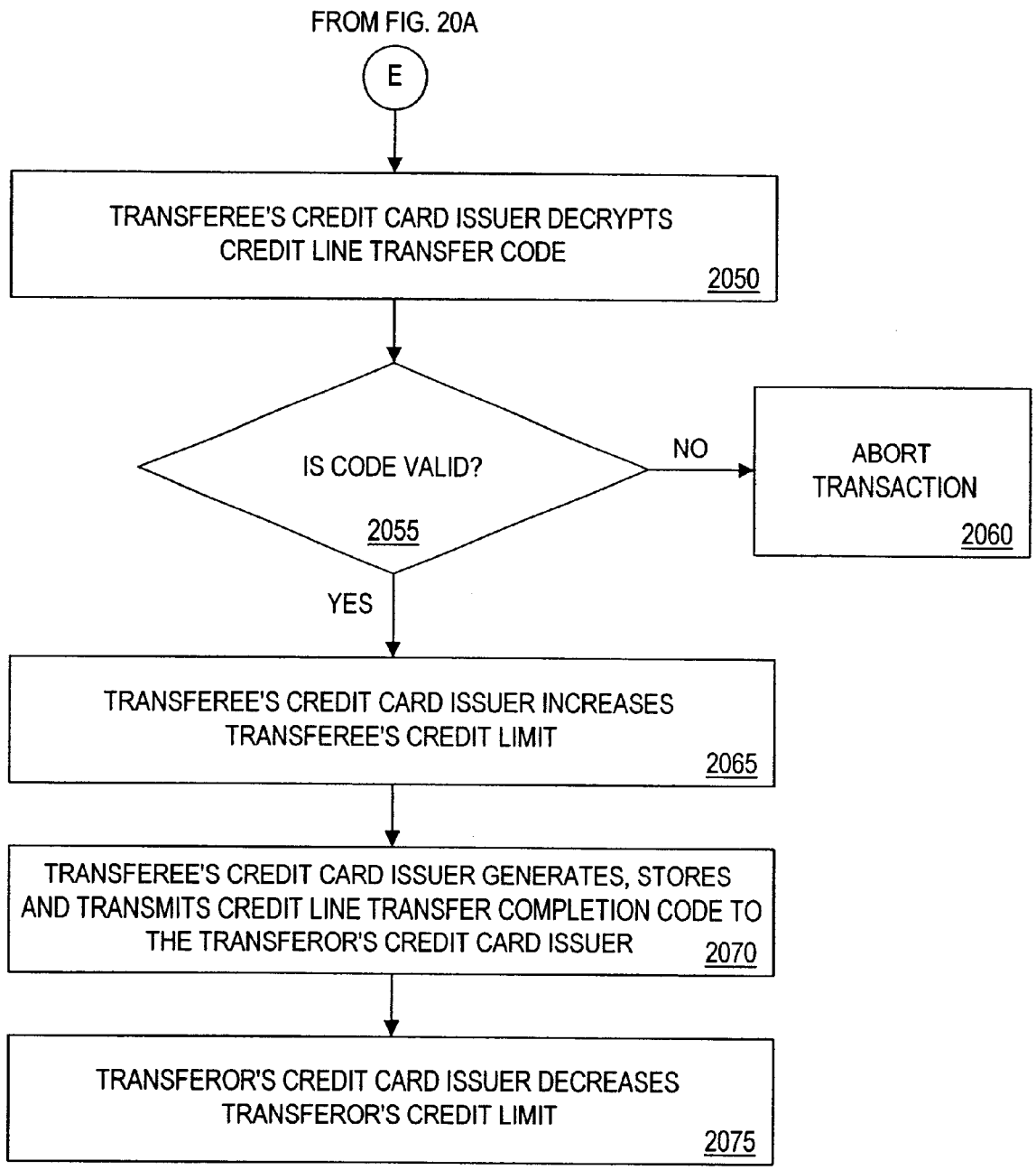

FIGS. 20A and 20B are a flowchart of the steps employed by financial tender transfer system 1500 in accordance with the implementation shown in FIG. 15. First, transferor 1510 initiates a credit line transfer by providing credit line transfer information to transferor's credit card issuer 1530 including the credit line amount or financial tender value to be transferred, the name of transferor 1510, the credit card account to transfer from, and the expiration date of that credit card (step 2010). Transferor's credit card issuer 1530 checks the validity of transferor's credit card against customer account database 1640 (step 2015) and aborts the transaction if it is invalid (step 2020). Transferor's credit card issuer 1530 also determines if transferor 1510 has sufficient credit available by checking against the available credit line in customer account database 1640 (step 2025). If the credit is insufficient, the transaction is aborted (step 2030).

Transferor's credit card issuer 1530 receives the credit line transfer information and generates an encrypted code which contains the credit line transfer information and issuer identification information (step 2035), and may also include transaction date and time information. This authorization code for the credit line transfer is given to transferor 1510. Transferor 1510 provides this authorization code to transferee 1520 (step 2040), who in turn contacts transferee's credit card issuer 1540 and provides the encrypted authorization code and transferee's credit card account number, name, and expiration date to execute the credit line transfer (step 2045).

After receiving the information from transferee 1520, transferee's credit card issuer 1540 decrypts the authorization code with the issuer key (step 2050). The validity of the code is determined by successful decryption. Transferee's credit card issuer 1540, in addition to confirming the code's validity, confirms the identification of transferor's issuing bank (step 2055) and aborts the transaction if the code is invalid (step 2060). If the authorization code is valid, transferee's credit card issuer 1540 completes the credit line transfer by increasing transferee's credit line by the amount specified in the decrypted code and updating transferee's records in its financial tender transfer database 1650 (step 2065). Transferee's credit card issuer 1540 then generates, stores, and transmits a credit line transfer completion code to transferor's credit card issuer 1530 (step 2070). Lastly, transferor's credit card issuer 1530 decreases transferor's credit limit and updates transferor's records in its financial tender transfer database 1650 (step 2075).

In this implementation, like the implementation described in connection with FIG. 13, transferee 1520 cannot misuse the transferor's ID Number by repeating the transaction multiple times because the Transferor ID Number, in this case, is a single use, transaction specific encrypted code which incorporates transaction specific information, such as the date and the time, and possibly other information including, for example, the amount of the transaction. The encrypted transaction ID that incorporates a date and time guarantees a unique ID for every transaction. The system prevents multiple uses of encrypted transaction IDs by only allowing each unique ID to be used once. At the same time, transferor 1510 cannot repudiate intent to transfer a credit line amount once transferor 1510 gives the encrypted code to transferee 1520. The encrypted code is a proxy for an authorization to transferee 1520 to effect a credit line transfer into the designated transferee credit card account.

B. Sale of Unused Credit Line

Figure 21:
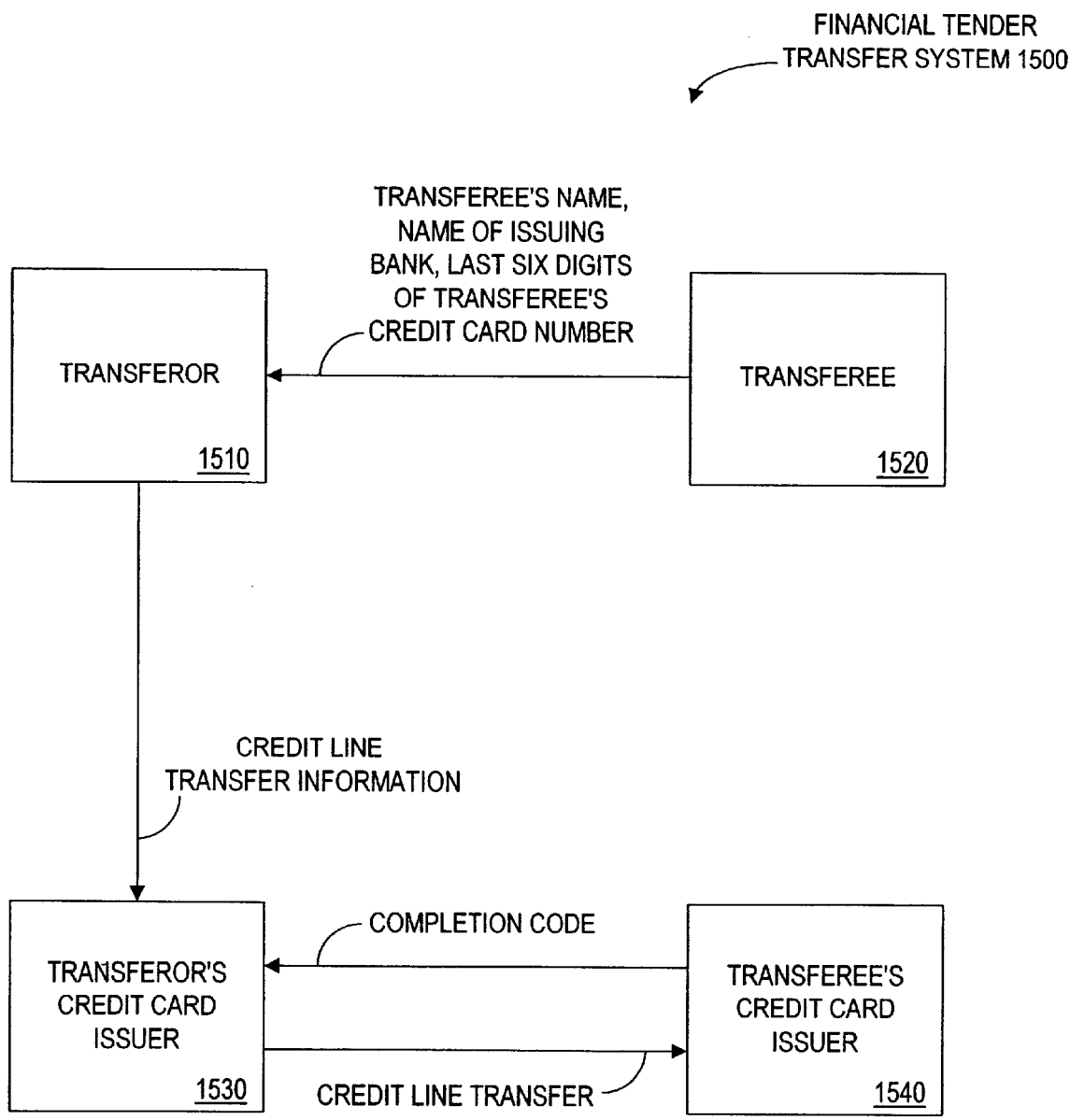
FIG. 21 is a block diagram of another implementation of a financial tender value transferring system consistent with the present invention.

FIG. 21 is a block diagram of another implementation of financial tender transfer system 1500 consistent with the invention. This implementation is preferably practiced in cases where a transferor is selling his unused credit line because the transferor is the party through which the transaction is executed. In other words, a transferor transfers an unused credit line amount to a transferee for a certain amount of consideration, but the transferor retains responsibility for payment of any debt on the unused credit line amount transferred. Similar to FIG. 15, financial tender transfer system 1500 of FIG. 21 includes a transferor 1510, a transferee, 1520, a transferor's credit card issuer 1530, and transferee's credit card issuer 1540.

Figure 22A:
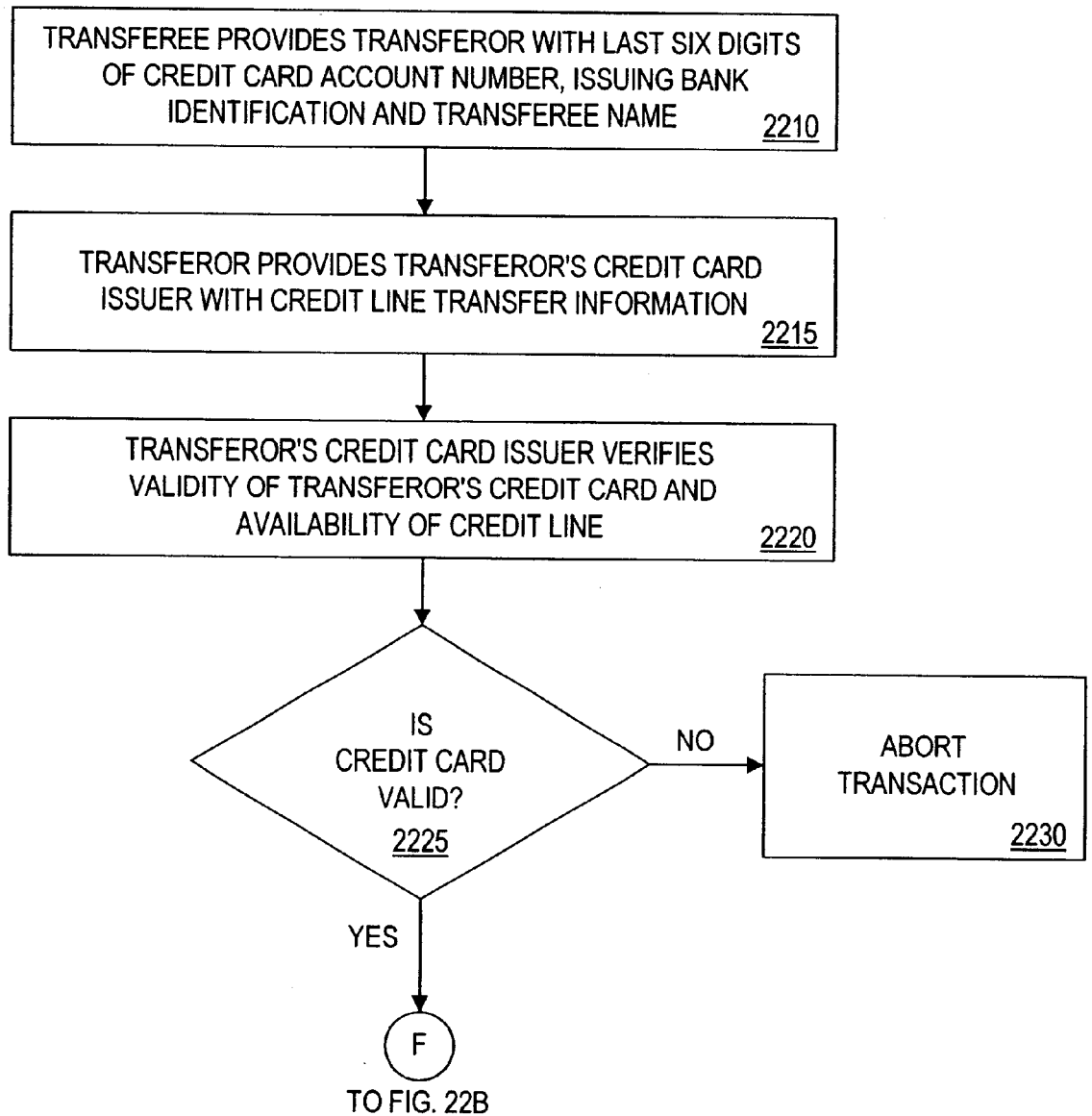
FIGS. 22A, 22B, and 22C are flowcharts representing the operation of the financial tender transferring system of FIG. 21.
Figure 22B:
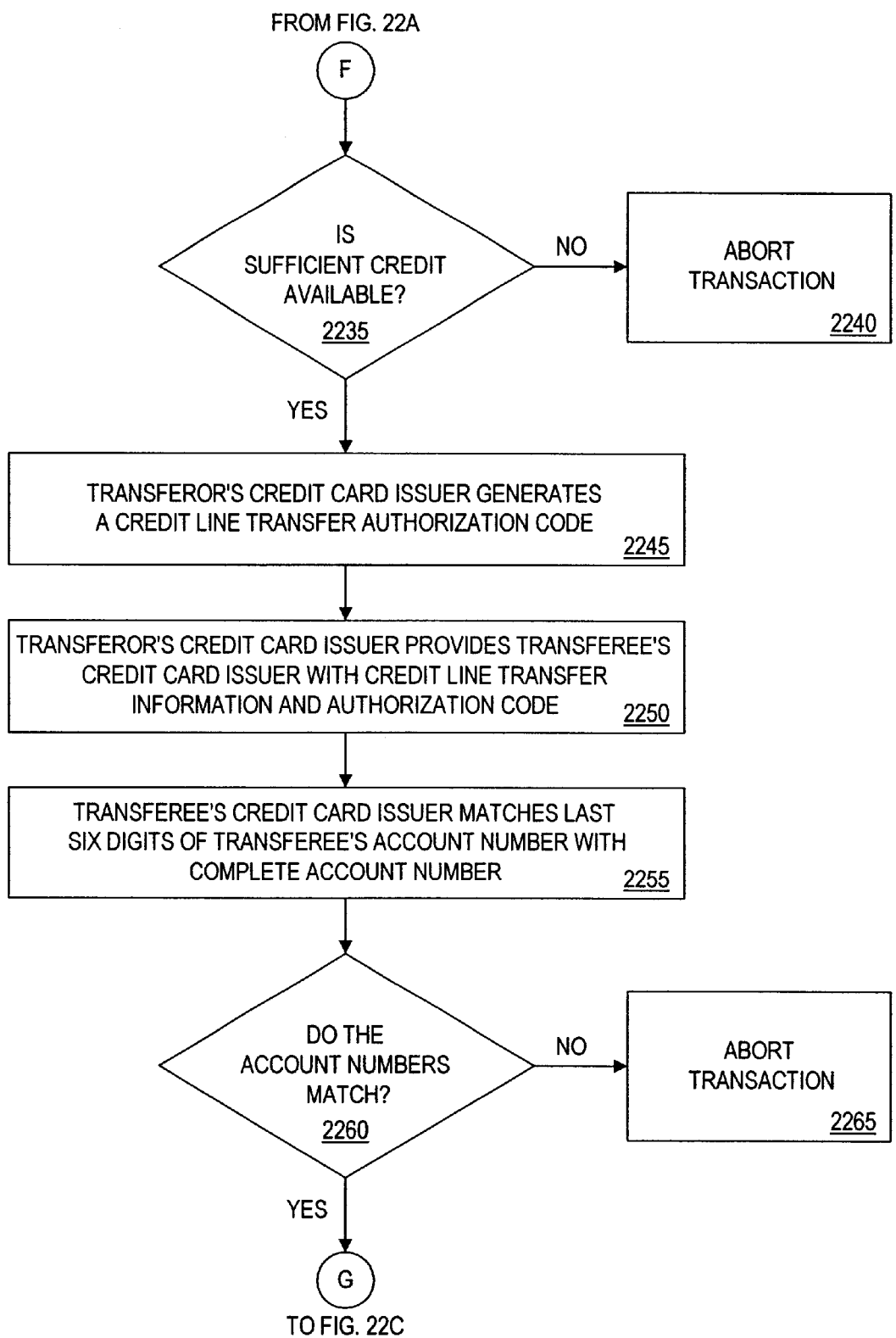
Figure 22C:
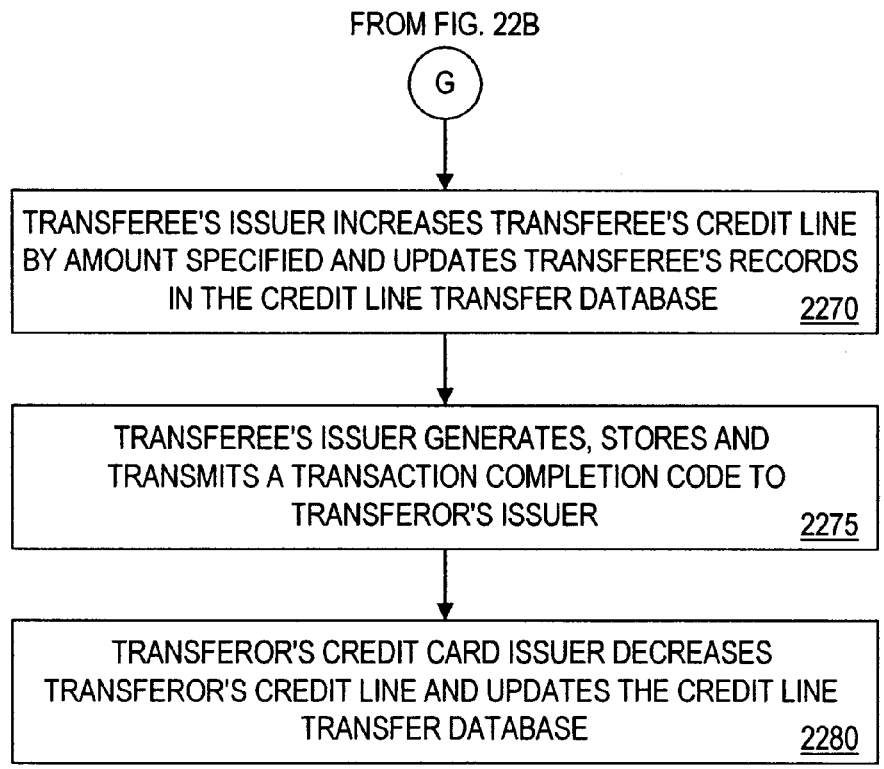

FIGS. 22A, 22B, and 22C are a flowchart of the steps employed by financial tender transfer system 1500 in accordance with the implementation shown in FIG. 21. First, transferee 1520 provides transferor 1510 with the last 6 digits or some specified portion of his credit card number, his issuing bank identification, and his name (step 2210). Transferor 1510 then initiates the credit line transfer by providing credit line transfer information to transferor's credit card issuer 1530 including the financial tender value to be transferred, the name of transferor 1510, the credit card account to transfer from, the expiration date of that credit card, the name of transferee 1520, the last 6 digits of the transferee's credit card account, and the name of transferee's credit card issuer 1540 (step 2215).

After receiving the credit line transfer information, transferor's credit card issuer 1530 verifies the validity of the transferor's credit card and availability of credit line against customer account database 1640 (step 2220). First, transferor's credit card issuer 1530 determines if transferor's credit card is valid (step 2225) and aborts the transaction if it is not (step 2230). If valid, transferor's credit card issuer 1530 also determines if transferor's credit card has sufficient credit available (step 2235) and aborts the transaction if it is insufficient (step 2240). If transferor's credit card is both valid and has sufficient credit available, transferor's credit card issuer 1530 generates a credit line transfer authorization code (step 2245). Transferor's credit card issuer 1530 then transmits the credit line transfer information to transferee's credit card issuer 1540 along with the authorization code (step 2250).

Transferee's credit card issuer 1540 matches the received last 6 digits or portion of the transferee's account number with the actual account number in its customer account database 1640 (step 2255). Transferee's credit card issuer 1540 determines whether to proceed with the transaction by matching the last 6 digits to the actual account number (step 2260). The transaction is aborted if they do not match (step 2265). Otherwise, transferee's credit card issuer 1540 completes the credit line transfer by increasing the transferee's credit line by the amount specified and by updating the transferee's records in its credit line transfer database 1650 (step 2270). The transferee's credit card issuer 1540 also generates, stores, and transmits a credit line transfer completion code to the transferor's credit card issuer 1530 (step 2275), who in turn decreases transferor's credit line and updates its credit line transfer database 1650 (step 2280).

CONCLUSION

The financial tender transfer system according to this invention allows a transferor to transfer credit or make payment to a transferee by debiting the credit card of the transferor and crediting the credit or debit card of the transferee. The financial tender transfer system gives the transferee immediate access to the transferred funds and/or credit line, ensures the transferor's credit card is valid, and preserves security.

It will be apparent to those skilled in the art that various modifications and variations can be made to disclosed embodiments of the present invention without departing from the scope or spirit of the invention. Other embodiments of the invention will be apparent to those skilled in the art from consideration of the specification and practice of the embodiments of the invention disclosed herein. The specification and examples should be considered exemplary, with the true scope and spirit of the invention being indicated by the following claims and their full range of equivalents.

What is claimed is:

1. A system for transferring funds between credit card accounts held by different individuals, comprising:

means for receiving information about a requested transfer of funds, the information including information used to identify a transferee credit card account, information used to identify a transferor credit card account, and information identifying an amount of funds to be transferred;

means for determining whether the transferor credit card account is valid and if sufficient funds are available to transfer the requested amount of funds;

means for determining whether the transferee credit card account is valid; and means for causing the amount of funds to be transferred from the credit card account of the transferor to the credit card account of the transferee, thereby increasing an amount owed by the transferor and decreasing an amount owed by the transferee.

2. The system of claim 1, wherein the information is received from the transferee.

3. The system of claim 1 wherein the information used to identify a transferee credit card account includes a transferee identification number, the system further comprising:

means for associating the transferee identification number with a transferee credit card account number, a transferee name, and an expiration date of the transferee credit card account.

4. The system of claim 1, wherein the information is received from the transferee after the transferee has received information used to identify the transferor from the transferor.

5. The system of claim 1 wherein the information used to identify a transferor credit card account includes a portion of a transferor credit card account number, a transferor name, and a transferor credit card account expiration date.

6. The system of claim 1 wherein the information used to identify a transferor credit card account includes an encrypted code, the system further comprising:

means for decrypting the encrypted code to recover a transferor credit card account number.

7. The system of claim 1, wherein the information is received from the transferor after the transferor has received information used to identify the transferee from the transferee.

8. A method for facilitating payment between a first and a second individual, the method comprising:

receiving information about a requested transfer of funds, the information including information used to identify a first credit card account held by the first individual, information used to identify a second credit card account held by the second individual, and information identifying an amount of funds to be transferred;

determining whether the first credit card account is valid and if sufficient funds are available to transfer the requested amount of funds;

determining whether the second credit card account is valid; and causing the amount of funds to be transferred from the first credit card account to the second credit card account, thereby increasing an amount owed by the first individual and decreasing an amount owed by the second individual.

9. The method of claim 8, wherein the information is received from the first individual.

10. The method of claim 8, wherein the information used to identify a first credit card account includes a first individual identification number, the method further comprising:

associating the first individual identification number with a first credit card account number, a name of the first individual, and an expiration date of the first credit card account.

11. The method of claim 8, wherein the information is received from the first individual after the first individual has received information used to identify the second individual.

12. The method of claim 11, wherein the information used to identify the second individual is received from the second individual.

13. The method of claim 8, wherein the information used to identify the second credit card account includes a portion of a second credit card account number, a name of the second individual, and a second credit card account expiration date.

14. The method of claim 8, wherein the information used to identify a second credit card account includes an encrypted code, the method further comprising:

decrypting the encrypted code to recover the second credit card account number.

15. The method of claim 8, wherein the information is received from the second individual after the second individual has received information used to identify the first individual.

16. The method of claim 15, wherein the information used to identify the first individual is received from the first individual.

* * * * *